United States Patent
Sasmal et al.

(10) Patent No.: US 11,475,776 B2
(45) Date of Patent: Oct. 18, 2022

(54) UTILIZING AXLE LOADING INFORMATION TO DETERMINING BRAKING CAPABILITIES OF VEHICLES FOR PLATOONING OPERATIONS

(71) Applicant: Bendix Commercial Vehicle Systems LLC, Elyria, OH (US)

(72) Inventors: Subashish Sasmal, Elyria, OH (US); Phillip J. Kasper, Elyria, OH (US); Jeffrey M. Carbaugh, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 203 days.

(21) Appl. No.: 16/709,134

(22) Filed: Dec. 10, 2019

(65) Prior Publication Data
US 2021/0174687 A1   Jun. 10, 2021

(51) Int. Cl.
*G08G 1/00* (2006.01)
*G05D 1/02* (2020.01)
(Continued)

(52) U.S. Cl.
CPC ........... *G08G 1/22* (2013.01); *B60W 30/0953* (2013.01); *B60W 40/10* (2013.01); *G05D 1/0295* (2013.01);
(Continued)

(58) Field of Classification Search
CPC ................ G08G 1/22; B60W 30/0953; B60W 2756/10; B60W 2050/0075; B60W 2556/65; G05D 1/0295
See application file for complete search history.

(56) References Cited

U.S. PATENT DOCUMENTS 4,685,745 A   8/1987 Reinecke
4,964,679 A   10/1990 Rath
(Continued)

FOREIGN PATENT DOCUMENTS

CN   102692297 B   9/2014
CN   105539440 A   5/2016
(Continued)

OTHER PUBLICATIONS

Axel Load Sensor, GNOM, https://technoton.co.in/pdf-files/GNOM_operation_manual.pdf, 2015. 38 Pages.
(Continued)

*Primary Examiner* — Jelani A Smith
*Assistant Examiner* — Toya Pettiegrew
(74) *Attorney, Agent, or Firm* — Tucker Ellis LLP

(57) ABSTRACT

Dynamic braking capability of a combination vehicle including a tractor and at least one trailer is provided based on a distribution of the load carried by the combination vehicle. Load distribution is determined directly using load sensors disposed at wheel pairs of the tractor and trailer(s) or indirectly by using a load sensor located at the drive axle of the tractor together with engine torque and vehicle speed signals for determining gross vehicle mass. A database having sub-databases therein each storing stopping distance calculation results for a corresponding combination vehicle type e.g. 5-axle single or 8-axle double, is indexed by using the determined load distributions for providing the dynamic braking capability based on the vehicle type and its load distribution. The database may also be indexed using Axle Load Allocation Factor that is calculated based on a mathematical combination of drive, steering, and gross trailer axle loading.

34 Claims, 12 Drawing Sheets

(51) Int. Cl.
*B60W 40/10* (2012.01)
*B60W 30/095* (2012.01)
*B60W 50/00* (2006.01)

(52) U.S. Cl.
CPC ............... *B60W 2050/0075* (2013.01); *B60W 2510/0657* (2013.01); *B60W 2520/10* (2013.01); *B60W 2530/10* (2013.01); *B60W 2556/45* (2020.02); *B60W 2556/65* (2020.02); *B60W 2754/30* (2020.02); *B60W 2756/10* (2020.02)

(56) References Cited

U.S. PATENT DOCUMENTS

| | | |
|---|---|---|
| 5,478,974 A | 12/1995 | O'Dea |
| 5,603,556 A | 2/1997 | Klink |
| 5,954,781 A * | 9/1999 | Slepian ............... B60R 16/0231 340/425.5 |
| 6,044,319 A | 3/2000 | Rosendahl et al. |
| 6,154,658 A | 11/2000 | Caci |
| 6,203,045 B1 | 3/2001 | Kyrtsos et al. |
| 6,278,360 B1 | 8/2001 | Yanagi |
| 6,813,561 B2 | 9/2004 | Macneille |
| 6,926,233 B1 | 8/2005 | Corcoran, III |
| 6,963,795 B2 | 11/2005 | Haissig et al. |
| 7,490,699 B2 | 2/2009 | Gil et al. |
| 7,668,645 B2 | 2/2010 | Lu et al. |
| 8,267,485 B2 | 9/2012 | Barlsen et al. |
| 8,618,951 B2 * | 12/2013 | Popovic ............ G08G 1/096783 340/905 |
| 9,396,661 B2 | 7/2016 | Okamoto |
| 9,494,944 B2 | 11/2016 | Alam et al. |
| 9,551,993 B2 | 1/2017 | Kolhouse et al. |
| 9,604,642 B2 | 3/2017 | Cudak et al. |
| 9,799,224 B2 | 10/2017 | Okamoto |
| 9,834,055 B2 | 12/2017 | Joachim et al. |
| 9,981,655 B2 | 5/2018 | Cosentino et al. |
| 10,552,879 B1 * | 2/2020 | Hardiman ............ G06Q 30/0278 |
| 2004/0079557 A1 * | 4/2004 | Saxon .................. G01G 19/086 177/136 |
| 2008/0271541 A1 | 11/2008 | Neuman |
| 2009/0198427 A1 * | 8/2009 | Christopher Jackson .................. B60T 8/1708 701/70 |
| 2013/0278442 A1 * | 10/2013 | Rubin ............... H04W 74/0816 340/905 |
| 2017/0016757 A1 | 1/2017 | Strong et al. |
| 2018/0188725 A1 | 7/2018 | Cremona et al. |
| 2018/0188744 A1 | 7/2018 | Switkes et al. |
| 2018/0197354 A1 | 7/2018 | Bitton et al. |
| 2018/0267559 A1 | 9/2018 | Switkes et al. |
| 2019/0147262 A1 * | 5/2019 | Kuehnle ................. G07C 5/008 340/439 |
| 2020/0010062 A1 * | 1/2020 | Switkes ..................... B60T 7/22 |
| 2020/0388164 A1 * | 12/2020 | Domprobst .......... G05D 1/0297 |

FOREIGN PATENT DOCUMENTS

| | | |
|---|---|---|
| CN | 105599756 A | 5/2016 |
| CN | 205524207 U | 8/2016 |
| EP | 303827 B1 | 2/1989 |
| EP | 1547891 B1 | 6/2005 |
| EP | 1788364 B1 | 1/2012 |
| EP | 3353024 A1 | 8/2018 |
| JP | 2010117771 A | 5/2010 |
| WO | 2014000932 A1 | 1/2014 |

OTHER PUBLICATIONS

Mehran Safdar, "A Mobile Vehicle Weight Sensor and its Application in Transportation", Case Study: Municipal Solid Waste Collection Vehicles) Jun. 6, 2015, 12 pages.

* cited by examiner

| loadcase | run | axle1_load | axle2_load | axle3_load | axle4_load | axle5_load | GCVW | Init_Spd | Stop_Dist | |
|---|---|---|---|---|---|---|---|---|---|---|
| 1 | 1 | 8401.513 | 8434.325 | 5524.59 | 5154.891 | 4925.598 | 32440.92 | 90.61001 | 41.49723 | ⎫ |
| 1 | 2 | 8404.994 | 8433.928 | 5518.408 | 5162.999 | 4909.629 | 32429.95 | 90.6254 | 41.74636 | ⎬ 420a |
| 1 | 3 | 8400.731 | 8434.981 | 5521.478 | 5163.21 | 4920.73 | 32441.13 | 90.58217 | 41.5411 | |
| 1 | 4 | 8403.432 | 8434.293 | 5529.492 | 5155.374 | 4920.609 | 32443.2 | 90.62087 | 41.13874 | |
| 1 | 5 | 8403.427 | 8435.716 | 5526.292 | 5155.986 | 4915.157 | 32436.58 | 90.46912 | 41.50225 | ⎭ |
| 2 | 1 | 8407.832 | 8418.718 | 12709.44 | 5161.842 | 4917.114 | 39614.94 | 7.062983 | 0.455815 | ⎫ |
| 2 | 2 | 8409.572 | 8414.945 | 12716.98 | 5140.969 | 4917.037 | 39599.5 | 91.03373 | 45.0951 | |
| 2 | 3 | 8408.554 | 8415.114 | 12711.33 | 5149.701 | 4917.364 | 39602.06 | 91.03427 | 45.16121 | ⎬ 420b |
| 2 | 4 | 8408.782 | 8414.512 | 12711.58 | 5160.717 | 4916.668 | 39612.28 | 91.11273 | 45.13195 | |
| 2 | 5 | 8409.038 | 8416.114 | 12709.3 | 5156.945 | 4914.814 | 39606.21 | 91.07997 | 45.32416 | ⎭ |
| 3 | 1 | 8408.265 | 8421.063 | 12709.83 | 5148.388 | 12086.58 | 46772.12 | 1.920342 | 0.072991 | ⎫ |
| 3 | 2 | 8408.365 | 8416.216 | 12715.19 | 5137.074 | 12087.11 | 46763.95 | 91.52395 | 46.65923 | |
| 3 | 3 | 8408.001 | 8415.404 | 12714.16 | 5139.897 | 12091.51 | 46768.97 | 91.4928 | 46.55878 | ⎬ 420c |
| 3 | 4 | 8408.071 | 8416.729 | 12711.14 | 5143.854 | 12086.19 | 46765.99 | 91.45645 | 46.57584 | |
| 3 | 5 | 8407.643 | 8415.338 | 12719.21 | 5131.329 | 12094.99 | 46768.51 | 91.52915 | 46.91208 | ⎭ |

⋮

| 18 | 1 | 8385.937 | 8159.346 | 21725.18 | 17412.45 | 5415.652 | 61098.56 | 2.095002 | 0.085767 | ⎫ |
|---|---|---|---|---|---|---|---|---|---|---|
| 18 | 2 | 8386.667 | 8158.548 | 21727.65 | 17417.4 | 5413.577 | 61103.84 | 91.46222 | 60.29488 | |
| 18 | 3 | 8386.174 | 8159.221 | 21723.39 | 17413.93 | 5417.725 | 61100.44 | 91.47703 | 60.28687 | ⎬ 420h |
| 18 | 4 | 8386.385 | 8158.115 | 21723.19 | 17414.96 | 5416.11 | 61098.76 | 91.45376 | 60.06238 | |
| 18 | 5 | 8386.58 | 8158.86 | 21732.91 | 17419.7 | 5414.077 | 61112.13 | 91.44742 | 60.33211 | ⎭ |

⋮

| 55 | 1 | 9536.741 | 20863.6 | 7058.521 | 11304.63 | 12325.67 | 61089.16 | 90.68043 | 46.57346 | ⎫ |
|---|---|---|---|---|---|---|---|---|---|---|
| 55 | 2 | 9536.635 | 20863.83 | 7044.7 | 11312.35 | 12336.16 | 61093.68 | 90.711 | 46.83449 | |
| 55 | 3 | 9536.708 | 20863.56 | 7062.293 | 11308.85 | 12351.04 | 61122.45 | 90.69518 | 46.32877 | ⎬ 420p |
| 55 | 4 | 9536.917 | 20863.24 | 7058.553 | 11312.76 | 12354.15 | 61125.63 | 90.6583 | 46.59581 | |
| 55 | 5 | 9537.032 | 20863.58 | 7059.896 | 11301.93 | 12339.28 | 61101.71 | 90.62143 | 46.4104 | ⎭ |

FIGURE 5

UTILIZING AXLE LOADING INFORMATION TO DETERMINING BRAKING CAPABILITIES OF VEHICLES FOR PLATOONING OPERATIONS

TECHNICAL FIELD

The embodiments herein relate generally to systems and methods for determining dynamic braking capabilities of highway vehicles carrying loads. More specifically, particular embodiments relate to braking performance determination of combination vehicles with components including a tractor and one or more trailers pulled by the tractor based on a distribution of the load across the various components of the combination vehicle. Although the embodiments will be described with reference to selected particular examples such as combination vehicles including a tractor and at least one trailer, it is to be appreciated that the claimed invention is also amenable to other applications and can be equivalently extended to other embodiments and environments such as for example to box trucks, doubles, triples, or the like.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles for providing enhanced efficiency, and larger platoons may involve multiple rows and/or columns of vehicles travelling in non-single file formations.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In a basic single file platoon as described above, the participant vehicles typically mutually cooperate to maintain a relatively fixed and constant (even or the same) distance between forward and rearward adjacent vehicles by exchanging deceleration commands and other signals between themselves. On flat roadways, the distances maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the distances maintained between the vehicles can be decreased during conditions of the platoon traversing an incline wherein the tendency of the overall platoon is to decrease speed slightly. Conversely, the distances maintained between the vehicles can be increased during conditions of the platoon traversing a decline wherein the tendency of the overall platoon is to increase speed slightly. In any case, the relative distances between the various vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

In general, the amount of loading on an axle determines the amount of braking force generated at tire/ground interface under that axle. As a general rule of thumb, the greater the axle loading, the greater the generated braking force. As the loading on an axle increases, however, the stopping distance benefits due to increase in braking force is eventually overcome by drawbacks due to the increased kinetic energy and momentum of the moving vehicle. In a combination vehicle with multiple axles, combined effects of each axle loading influences the vehicle dynamics and overall braking performance.

The braking efficiency of any vehicle can in general be expected to change with each gross load. It has been discovered however that the braking efficiency of any given vehicle can also change differently for each load of the given vehicle having the same gross load weight, but distributed or otherwise arranged differently on the axles. That is, braking capabilities of vehicles cannot reliably be assumed to be a constant based on gross vehicle weight since the vehicle might not have been initially loaded using an even load distribution scheme and also because the vehicle's' load distributions may change from route stop to stop even though the braking hardware may remain the same from load to load and from route stop to stop. Vehicle testing has shown that the widely-accepted assumption of a heavier vehicle having longer stopping distances than a lighter vehicle does not hold true in all circumstances. Hence, the gross combination vehicle weight cannot be solely utilized as a deciding factor in determining dynamic braking capabilities of highway vehicles for use in determining safe gaps between vehicles in a platoon, ordering vehicles in a platoon, or if platooning is allowable. The influence of variabilities in load distribution that affect braking performance makes the important platoon management of vehicle ordering and gap distance management between the platooning vehicles more difficult.

Given the above, therefore, it would be helpful to dynamically learn or otherwise calculate or determine the braking capability and braking performance parameters of each platooning vehicle over time and, particularly, after receiving each of the respective loads onto the combination vehicle.

It would also be helpful to dynamically learn or otherwise calculate or determine the braking capability and braking performance parameters of each platooning vehicle after each loading and/or unloading operation, and to use the thereby determined braking capability and braking performance parameters as criteria within the vehicle to control braking operations of the vehicle.

It would also be helpful to dynamically learn or otherwise calculate or determine the braking capability and braking performance parameters of each platooning vehicle after each loading and/or unloading operation, and to transmit the braking capability and braking performance parameters to other vehicles participating in a platoon for determining the order of and the gap between the vehicles of the platoon to maximize the safety of the non-platooning vehicles relative to the platooning vehicles.

It would also be helpful to dynamically learn or otherwise calculate or determine the braking capability and braking performance parameters of each platooning vehicle after each loading and/or unloading operation, and to use the braking capability and braking performance parameters as criteria for determining the order of and the gap between the vehicles of the platoon to maximize the safety of the non-platooning vehicles relative to the platooning vehicles.

SUMMARY OF THE EXAMPLE EMBODIMENTS

The embodiments herein provide for new and improved systems and methods for dynamically learning or otherwise calculating or determining the braking capability and braking performance parameters of vehicles such as platooning vehicles for example in accordance with axle loading information.

The embodiments herein provide for new and improved systems and methods for dynamically learning or otherwise calculating or determining the braking capability and braking performance parameters of vehicles such as platooning vehicles for example relative to the other vehicles of the platoon in accordance with axle loading information.

The embodiments herein provide for new and improved systems and methods for using the relative braking capability and braking performance parameters of the platooning vehicles learned or otherwise calculated or determined as criteria for determining whether the vehicles are capable or otherwise qualified for platooning.

The embodiments herein provide for new and improved systems and methods for using the relative braking capability and braking performance parameters of the platooning vehicles learned or otherwise calculated or determined as criteria for determining the ordering and/or the re-ordering of the vehicles of the platoon to maximize the safety of the non-platooning vehicles relative to the platooning vehicles.

The embodiments herein provide for new and improved systems and methods for using the relative braking capability and braking performance parameters of the platooning vehicles learned or otherwise calculated or determined as criteria for determining the platooning gap distance to be maintained between a first combination vehicle and another combination vehicle during collaborative platooning between the first combination vehicle and the other combination vehicle.

In accordance with another aspect, a platoon management control system and method uses braking performance data representative of the braking capabilities of the platooning vehicles to manage the gap distances between the vehicles to help ensure that the vehicles do not collide during braking operations.

It is important to operate vehicles within conservative margins of safety. However, braking efficiency is affected by many factors such as brake temperature, brake type, burnishing, vehicle weight, number of tires, tire wear, vehicle overall load, vehicle load distribution, road surface type, and weather conditions. Braking efficiency can also change over time, and can also be affected based on a distribution of the load across the various components of the combination vehicle and by load distributions within the individual components of the combination vehicle. Accordingly, in an example embodiment herein, a system is provided for determining a dynamic braking capability of an associated combination vehicle including a tractor and at least one trailer, the tractor having at least one drive axle and a steering axle, and the at least one trailer having at least one trailer axle, wherein the system comprises a control unit configured to be disposed in the associated combination vehicle, and a vehicle load input operatively coupled with the control unit. The control unit includes a processor, a non-transient memory device operatively coupled with the processor, logic stored in the non-transient memory device, and a vehicle stopping distance table stored in the non-transient memory device. The vehicle stopping distance table includes table data mapping vehicle operating condition lookup data to stopping distance output data, wherein the vehicle operating condition lookup data is representative of a vehicle operating condition of the associated combination vehicle and the stopping distance output data is representative of an estimated stopping distance of the associated combination vehicle. The vehicle load input is operable to receive a vehicle load signal representative of a sensed load on one or more of the at least one drive axle of the tractor of the associated combination vehicle, the steering axle of the tractor of the associated combination vehicle, and/or the at least one trailer axle of the at least one trailer of the associated combination vehicle, and generate vehicle load data representative of the sensed load based on the received vehicle load signal. The logic of the control unit is executable by the processor to determine vehicle operating condition data in accordance with the vehicle load data, and apply the determined vehicle operating condition data as the vehicle operating condition lookup data to the vehicle stopping distance table stored in the non-transient memory device. The logic of the control unit is further executable by the processor to retrieve predicted stopping distance output data mapped relative to the determined vehicle operating condition data by the vehicle stopping distance table, the retrieved predicted stopping distance output data being representative of a predicted stopping distance of the associated combination vehicle based on the determined vehicle operating condition data applied to the vehicle stopping distance table. The logic of the control unit is yet still further executable by the processor to determine the dynamic braking capability of the associated combination vehicle as the predicted stopping distance.

In accordance with a further example embodiment, the system of the example embodiment includes vehicle speed and torque sensor inputs operatively coupled with the control unit for indirectly measuring the load distribution in the combination vehicle. The vehicle speed sensor is operable to receive a vehicle speed signal representative of a sensed speed of the associated combination vehicle traveling on an associated roadway, and generate vehicle speed data representative of the sensed speed based on the received vehicle speed signal. Correspondingly, the vehicle torque sensor is operable to receive a torque signal representative of a sensed torque between the associated combination vehicle and the associated roadway during a change in speed of the associated combination vehicle relative to the associated roadway, generate torque data representative of the sensed torque based on the received torque signal. In the example embodiment, the logic of the control unit is executable by the processor to generate combination vehicle gross mass data in accordance with a predetermined combination of the torque data with the vehicle speed data, the combination vehicle gross mass data being representative of a gross vehicle weight of the combination vehicle. The logic of the control unit is further executable by the processor to determine the dynamic braking capability of the associated combination vehicle by applying the combination vehicle gross mass data as the vehicle operating condition data to the vehicle stopping distance table.

In accordance with yet a further example embodiment, the system of the example embodiment includes drive, steering, and trailer axle load sensor devices operatively coupled with the control unit for directly measuring the load distribution in the combination vehicle. The drive axle load sensor device is configured to be disposed at the at least one drive axle of the associated combination vehicle, the steering drive axle load sensor device is configured to be disposed at the steering axle of the associated combination vehicle, and the trailer axle load sensor device is correspondingly configured to be disposed at the at least one trailer axle of the associated combination vehicle. The drive axle load sensor device is operable to receive a vehicle drive axle load signal representative of a sensed load on the at least one drive axle of the tractor of the associated combination vehicle, generate vehicle drive axle load data representative of the received vehicle drive axle load signal, and transmit the vehicle drive axle load data to the control unit. The steering axle load sensor device is operable to receive a vehicle steering axle load signal representative of a sensed load on the steering axle of the tractor of the associated combination vehicle, generate vehicle steering axle load data representative of the received vehicle steering axle load signal, and transmit the vehicle steering axle load data to the control unit. The trailer axle load sensor device is operable to receive a trailer axle load signal representative of a sensed load on the at least one trailer axle of the at least one trailer of the associated combination vehicle, generate trailer axle load data representative of the received trailer axle load signal, and transmit the trailer axle load data to the control unit. In the example embodiment, the logic of the control unit is executable by the processor to determine the vehicle operating condition data in accordance with the vehicle drive axle load data, the vehicle steering axle load data, and trailer axle load data, and determine the dynamic braking capability of the associated combination vehicle by applying the determined vehicle operating condition data as the vehicle operating condition lookup data to the vehicle stopping distance table stored in the non-transient memory device.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 5 is a database portion showing example details of selected ones of the sets of vehicle configuration databases provided in the example database illustrated in FIG. 4.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of example embodiments of the present invention and how it may be practiced. Other embodiments can be utilized to practice the present invention and structural and functional changes can be made thereto without departing from the scope of the claims herein.

Figure 1:
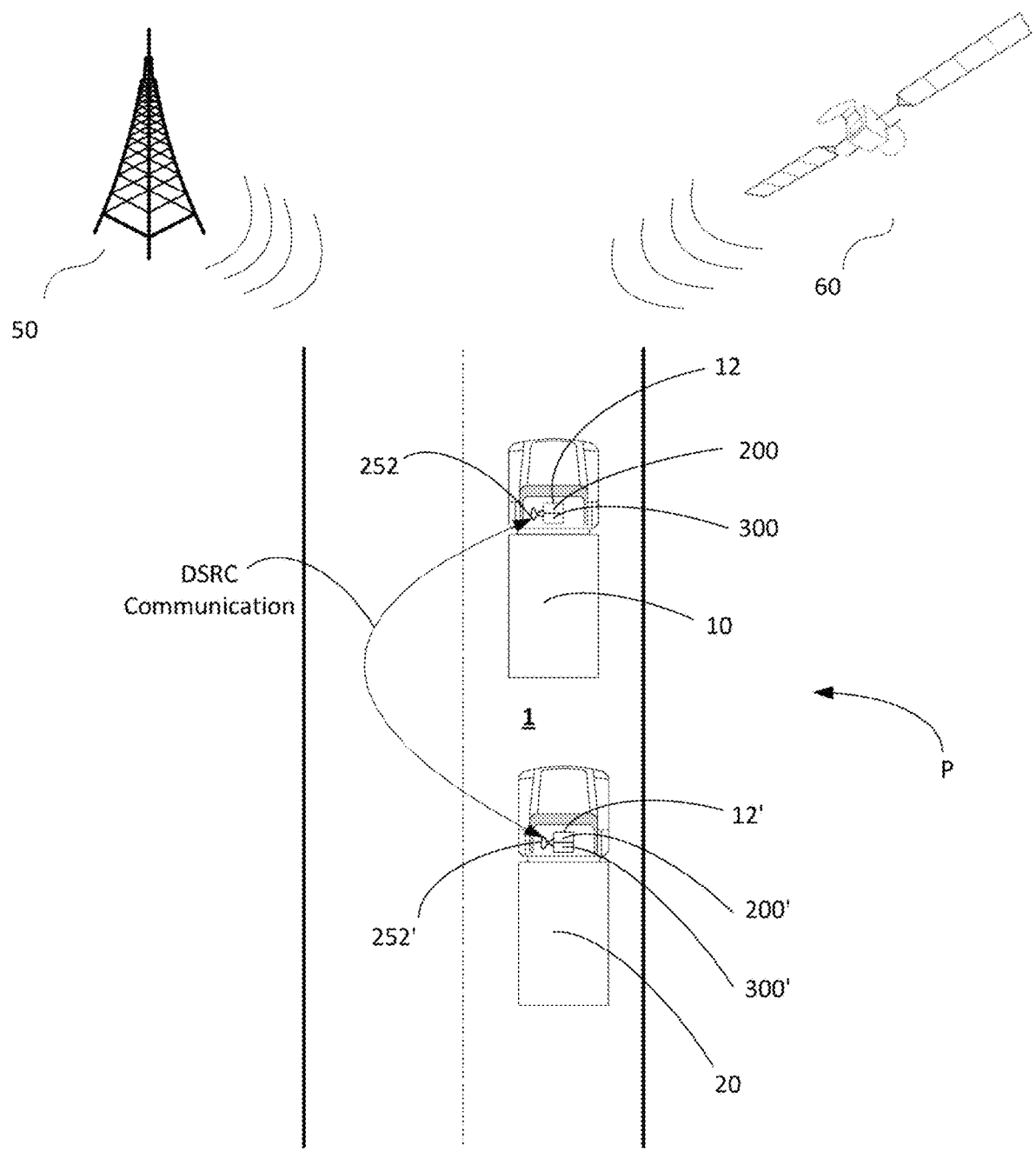
FIG. 1 is a schematic depiction of operation of an exemplary platoon in accordance with the embodiments.

Referring now to the drawings, wherein the showings are for the purpose of illustrating the example embodiments for utilizing axle loading information to determine braking capabilities of vehicles for platooning operations by way of example only, and not for purposes of limiting the same, FIG. 1 illustrates a basic platoon P including a first or leader vehicle 10 in traffic with a second or follower vehicle 20 in accordance with the present disclosure. As shown, the follower vehicle 20 is traveling proximate to the leader vehicle 10 seriatim in an ordered platoon P along a roadway 1. The leader vehicle 10 is provided with an electronic dynamic braking capability determination control system 12 which includes a data collection and communication module portion 200 and a platooning control portion 300 to be described in greater detail below. Similarly, the follower vehicle 20 is also provided with an electronic dynamic braking capability determination control system 12' which includes a data collection and communication module portion 200' and a platooning control portion 300'. In the example embodiments to be described herein, each of the two or more vehicles comprising the various platoons that will be described include the same or equivalent electronic control system 12, the same or equivalent data collection and communication module portion 200, and the same or equivalent platooning control portion 300, although other control systems having the functionality to be described herein may equivalently be used as necessary or desired.

In the example embodiment illustrated, the electronic dynamic braking capability determination control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). In some example embodiments herein, the communication is directly between platooning vehicles for sharing dynamic braking capabilities between the vehicles for determining a capability of collaborative platooning between the vehicles, a platoon vehicle ordering or ranking during the collaborative platooning, and inter-vehicle gap distance(s) to be maintained during the collaborative platooning without the need to consult with or act under the direction of or in concert with the remote wireless communication system 50, the remote satellite system 60, the remote fleet management facility, a Central Command Center (CCC), a Network Operations Center (NOC), or the like. In further embodiments, each vehicle may communicate its own derived dynamic braking capability to a remote fleet management facility, a CCC, a NOC, or the like via the remote wireless communication system 50 or the remote satellite system 60 whereat the remote fleet management facility, CCC, NOC, or the like may determine the platooning parameters such as a platooning capability, a platoon ordering and/or an inter-vehicle platoon distance gap to be maintained for distribution by the remote wireless communication system 50 or the remote satellite system 60 to other vehicles that may potentially platoon or that are actively platooning.

In addition to the above, the electronic dynamic braking capability determination control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple)vehicle (V2V Broadcast) communication (communication between a broadcasting vehicle and two or more responding vehicles), and further as well as various vehicle-to-infrastructure (V2I) communication. In an example embodiment the local V2V Unicast and V2V Broadcast communication follows the J2945 DSRC communications specification. In this regard, in an example embodiment, the vehicles forming the basic platoon P can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. In further example embodiments, the vehicles forming the basic platoon P can further communicate with a fleet management facility, CCC, or Noc remotely as may be necessary and/or desired via the remote wireless communication system 50 or the remote satellite system 60 for initiating into a platoon and maintaining vehicle order and inter-vehicle gaps in accordance with further example embodiments herein.

Figure 2:
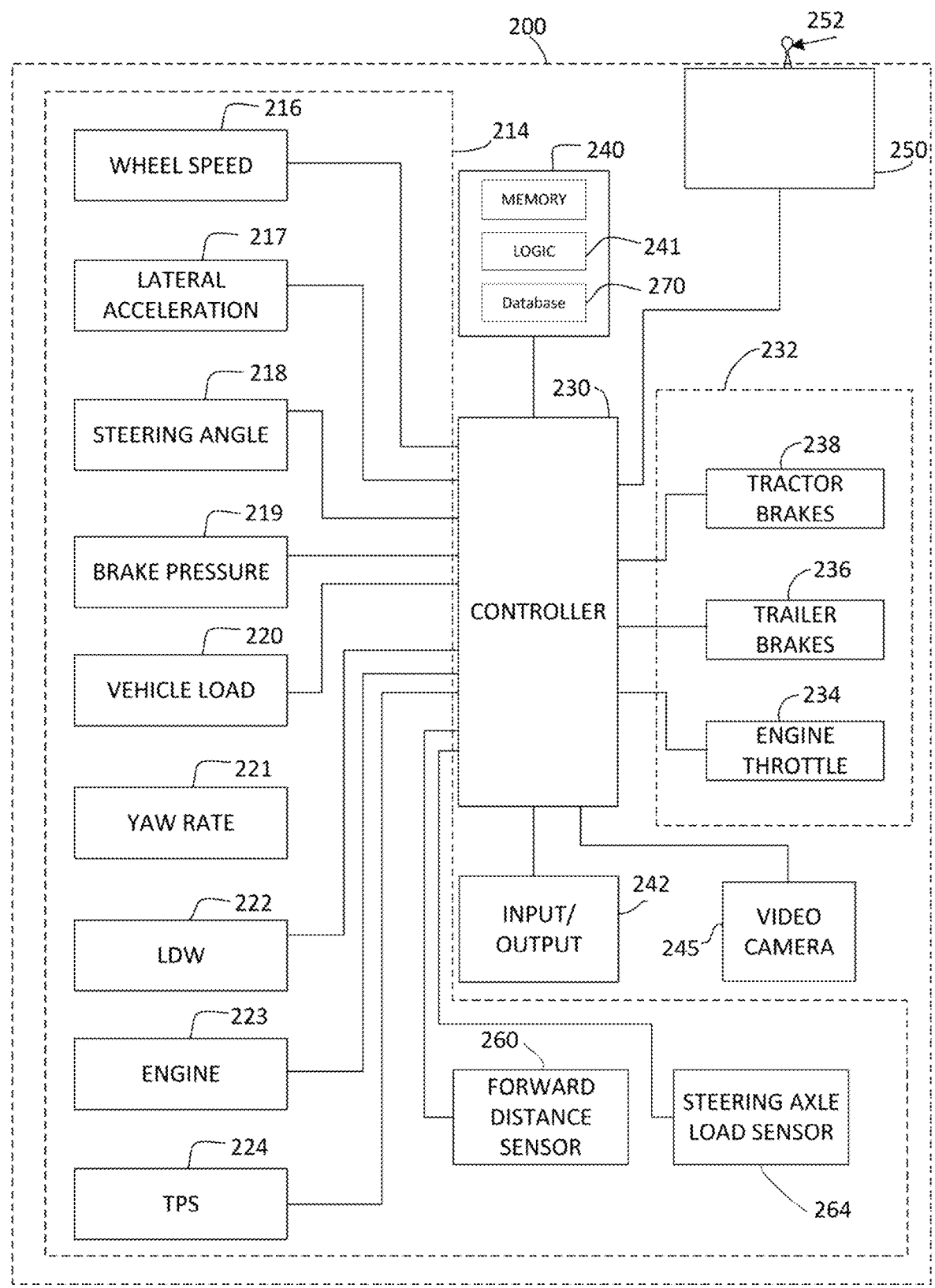
FIG. 2 is a schematic illustration of an exemplary embodiment of a data collection and communication module portion of the subject dynamic braking capability determination control system according to the example embodiment.

With reference next to FIG. 2, a schematic representation of a data collection and communication module portion 200 of the subject system for determining dynamic braking capabilities of highway vehicles carrying loads utilizing axle loading information according to principles of the example embodiment is illustrated. The data collection and communication module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, one or more engine condition sensors 223, and a tire pressure monitoring system (TPMS) 224. The data collection and communication module 200 may also utilize additional devices or sensors in the exemplary embodiment including for example a forward distance sensor 260, and a steering axle load sensor 264. Other sensors and/or actuators or energy generation devices or combinations thereof may be used of otherwise provided as well, and one or more devices or sensors may be combined into a single unit as may be necessary and/or desired.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value. The controller 230 may also include one or more outputs for delivering a control signal to one or more vehicle systems 232 based on the comparison. The control signal may instruct the systems 232 to intervene in the operation of the vehicle to initiate corrective action. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. In a tractor-trailer arrangement, the controller 230 may engage the trailer brakes 236 on one or more wheels of a trailer portion of the vehicle, and the tractor brakes 238 on one or more wheels of a tractor portion of the vehicle. A variety of corrective actions may be possible and multiple corrective actions may be initiated at the same time.

The controller 230 may also include or otherwise be operatively associated with a memory portion 240 for storing and accessing system and other information, such as for example system control and tuning logic 241 and a database 270 storing dynamic braking capability information in one or more tables correlating vehicle load distribution parameters with stopping distance data. The memory portion 240 may be separate from the controller 230 as shown or integrated within the controller as may be necessary or desired. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The data collection and communication module 200 may also include an input/output connection 242 that may serve as a source of input data indicative of a configuration or a condition such as a weight of the vehicle. The controller 230 may sense or estimate the configuration/condition of the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, brake pressure rates, and magnitudes and maximums to be applied during corrective action.

In an example embodiment the input/output connection 242 may be in operative communication with an associated electronic command module (ECM) of the tractor of the associated combination vehicle for receiving one or more signals and/or data for indirectly determining the vehicle operating condition data in accordance with an inferred vehicle load to determine the dynamic braking capability of the associated combination vehicle as the predicted stopping distance. In the example embodiment, the vehicle speed sensor input comprises a vehicle speed signal input connection 242 of the control unit in operative communication with a vehicle speed signal output connection of an associated electronic command module (ECM) of the tractor of the associated combination vehicle. The vehicle speed signal input connection 242 of the control unit receives the vehicle speed signal from the vehicle speed signal output connection of the associated ECM of the tractor of the associated combination vehicle. In addition, the vehicle load input comprises a load signal input connection 242 of the control unit in operative communication with a vehicle load output connection of the associated ECM of the tractor of the associated combination vehicle. The load signal input connection 242 of the control unit receives the vehicle load signal from the vehicle load output connection of the associated ECM of the tractor of the associated combination vehicle. In further addition, the vehicle torque sensor input comprises a torque signal input connection 242 of the control unit in operative communication with a vehicle torque output connection of the associated ECM of the tractor of the associated combination vehicle. The torque signal input connection 242 of the control unit receives the torque signal from the vehicle torque output connection of the associated ECM of the tractor of the associated combination vehicle. In that way, the logic of the control unit is further executable by the processor to determine the dynamic braking capability of the associated combination vehicle by applying the one or more signals and/or data received from the associated ECM of the tractor of the associated combination vehicle.

A vehicle configuration or condition may refer to a set of characteristics of the vehicle which may influence the vehicle's stability (roll and/or yaw), stopping distance capabilities or braking performance. For example, in a vehicle with a towed portion, the source of input data at the input/output connection 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination. In accordance with an example embodiment, the dynamic braking capability control tuning may be different for the same load but distributed differently across a single trailer, a double trailer combination, or a triple trailer combination.

The type of load the commercial vehicle is carrying, the location of the center of gravity of the load, and the distribution of the load as determined for example utilizing axle loading information also influences vehicle stability and braking performance. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars. In addition, a double trailer combination vehicle having a gross vehicle weight of 80,000 lbs. with the load distributed 10,000 lbs. to the first trailer and 60,000 lbs. to the second trailer, for example, will have a dramatically different braking performance and/or ability as against the same vehicle with the same gross vehicle weight but having the same load distributed 60,000 lbs. to the first trailer and 10,000 lbs. to the second trailer.

In addition, the controller 230 is operatively coupled with one or more video image capture devices shown in the example embodiment as a single video camera 245 representation of one or more physical video cameras disposed on the vehicle such as, for example, one video camera on each corner of the vehicle.

Still yet further, the data collection and communication module portion 200 of the subject system for determining dynamic braking capabilities of highway vehicles carrying loads utilizing axle loading information may also include a transmitter/receiver (transceiver) device 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG. 1) having a corresponding receiver and antenna. The transmitter/receiver (transceiver) device 250 may include various functional parts of sub portions operatively coupled with the platoon control unit including for example a wireless receiver portion or device, a wireless transmitter portion or device, a global position sensor (GPS) receiver portion, a communication transmitter, or the like. For communication of specific information and/or data, the communication receiver and transmitter portions may include one or more functional and/or operational communication interface portions as well. Also, the transceiver device 250 may comprise a wireless transmitter and/or receiver devices that may be provided separately or combined into an integrated transceiver module or device.

Figure 3:
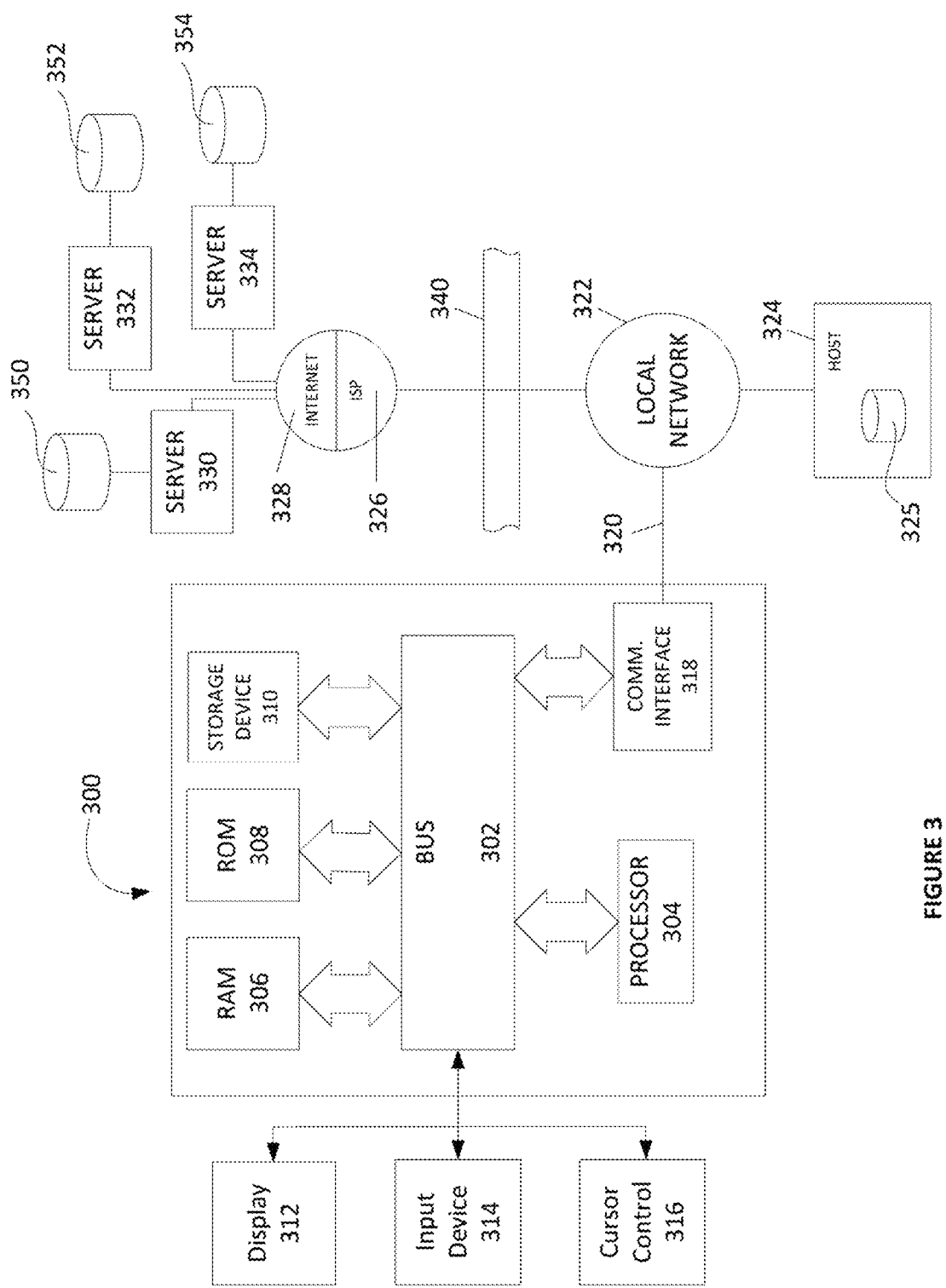
FIG. 3 is a block diagram that illustrates a platoon control computer system suitable for executing embodiments of one or more software systems or modules that perform dynamic braking capability determination utilizing load distribution information according to the example embodiment.

FIG. 3 is a block diagram that illustrates a platoon control computer system 300 suitable for executing embodiments of one or more software systems or modules that perform fleet management and control according to the subject application for determining and using braking capabilities of vehicles based on axle loading information for platooning operations of fleet vehicles in a platoon. The example system includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20. Further, the embodiments described herein are related to the use of computer system 300 for accessing information from the multiple sources in selective combination with internal proprietary data such as driver sensitive data, sales, costs, expense records, travel data, special load data or information and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon self-ordering computer system 300, are exemplary forms of carrier waves transporting the information.

The platoon computer system 300 can send messages and receive data, including program code, through the network(s), network link 320 and communication interface 318. In the Internet-connected example embodiment, the platoon computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although platoon computer system 300 is shown in FIG. 3 as being connectable to a set of three (3) servers, 330, 332, and 334, those skilled in the art will recognize that platoon computer system 300 may establish connections to multiple additional servers on Internet 328. Each such server in the example embodiments includes HTTP-based Internet applications, which may provide information to platoon computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon computer system 300 suitably includes several subsystems or modules to perform the platoon control and management as set forth herein. Primary purposes of the subject application are to determining dynamic braking capabilities of highway vehicles carrying loads utilizing axle loading information and to provide this information to platoon control and management for arranging two or more vehicles cooperatively travelling as a platoon along an associated roadway into a platoon arrangement so that the vehicle having the desired braking capabilities is placed accordingly in the platoon arrangement. Other primary purposes of the subject application include use of the determined dynamic braking capabilities utilizing the axle loading information for controlling the gap distances between the platooning vehicles in accordance with their relative braking capabilities and in accordance with other brake-related performance characteristics.

Figure 4:
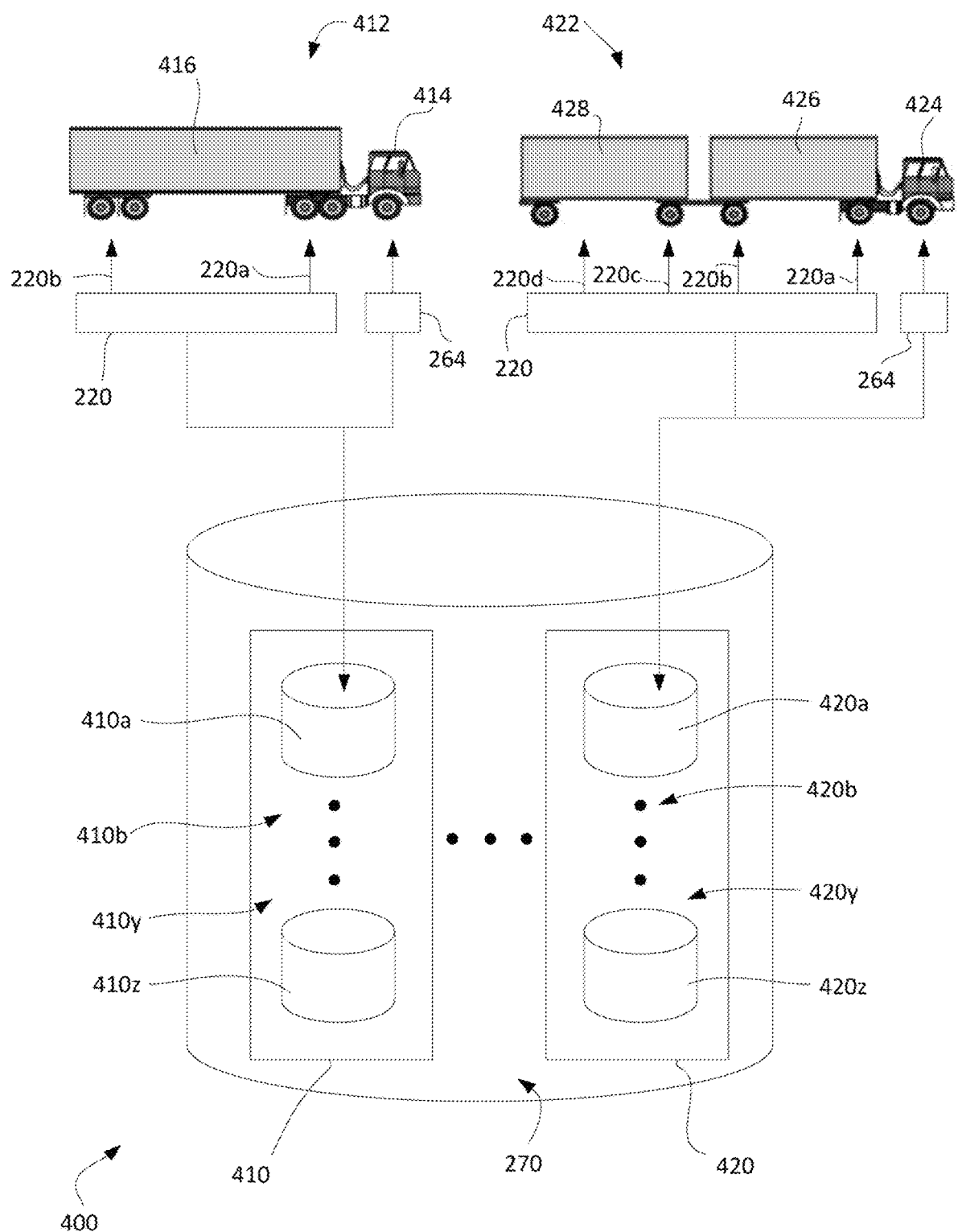
FIG. 4 is a schematic illustration of a database in the memory of the controller 230 of FIG. 2 depicting the storage of dynamic braking capability information tables correlating vehicle load distribution parameters of particular types of vehicle configurations having varied load arrangements with stopping distance data in accordance with an example embodiment.

FIG. 4 is a schematic illustration of the database 270 of the memory portion 240 of the controller 230 of FIG. 2 for storing and accessing system and other information and depicting the storage of dynamic braking capability information in one or more tables correlating vehicle load distribution parameters of particular types of vehicle configurations having varied load arrangements with stopping distance data in accordance with an example embodiment.

In the example illustrated, a first set 410 of vehicle configuration databases 410a-410z is provided in the database 270 for storing the dynamic braking capability of an example combination vehicle 412 having a tractor 414 pulling a single trailer 416 and having a steering axle load sensor 264 (FIG. 2) developing a steering axle load signal converted by the data collection and communication module portion 200 of the electronic dynamic braking capability determination control system 12 into steering axle load data, and having a set of vehicle load sensors 220 including a drive axle load sensor 220a developing a drive axle load signal in turn converted to drive axle load data and a trailer axle load sensor 220b developing a trailer axle load signal in turn converted to trailer axle load data. Further in the example embodiment, each of the vehicle configuration databases 410a-410z of the first set 410 provided in the database 270 stored data relate a different loadcase with a predicted or observed stopping distance for a given initial speed of the example combination vehicle 412 such as for example 90 kilometers per hour (kph) prior to effecting the stopping operation.

As an example, the first vehicle configuration database 410a of the first set 410 of vehicle configuration databases may store data relating a first loadcase of a steering axle weight of 8400 pounds (lbs.), a drive axle set weight of 8,000 lbs., and a trailer axle set weight of 15,000 lbs. to a stopping distance or 41 meters (m.) for an initial nominal speed of 90 kph prior to effecting the stopping operation with the example combination vehicle 412 having this first loadcase. In addition, a further vehicle configuration database 410z may store data relating a further specific loadcase of a steering axle weight of 8400 lbs., a drive axle set weight of 5,000 lbs., and a trailer axle set weight of 8,000 lbs. to a stopping distance or 81 meters for the nominal initial speed of 90 kph prior to effecting the stopping operation with the example combination vehicle 412 having this further loadcase.

Additional vehicle configuration databases 410b-410y are provided in the database 270 for storing the dynamic braking capability of the example combination vehicle 412 having varied loadcases stored in relation to the corresponding predicted or observed stopping distances wherein the a same overall gross load is arranged differently in the single trailer 416 and wherein different and varied overall gross loads are arranged differently in the single trailer 416 of the example combination vehicle 412.

Also in the example illustrated in FIG. 4, a second set 420 of vehicle configuration databases 420a-420z is provided in the database 270 for storing the dynamic braking capability of another example combination vehicle 422 having a tractor 424 pulling a first trailer 426 and a second trailer 428 and having a steering axle load sensor 264 (FIG. 2) developing a steering axle load signal converted by the data collection and communication module portion 200 of the electronic dynamic braking capability determination control system 12 into steering axle load data, and having a set of vehicle load sensors 220 including a drive axle load sensor 220a developing a drive axle load signal in turn converted to drive axle load data, a first trailer axle load sensor 220b developing a first trailer axle load signal in turn converted to first trailer axle load data, a dolly axle load sensor 220c developing a dolly axle load signal in turn converted to dolly axle load data, and a second trailer axle load sensor 220d developing a second trailer axle load signal in turn converted to second trailer axle load data. Further in the example embodiment, each of the vehicle configuration databases 420a-420z of the second set 420 provided in the database 270 stored data relate a different loadcase with a predicted or observed stopping distance for a given initial speed of the example combination vehicle 422 such as for example 90 kilometers per hour (kph) prior to effecting the stopping operation.

As an example, the first vehicle configuration database 420a of the second set 420 of vehicle configuration databases may store data relating a first loadcase of a steering axle weight of 8400 lbs., a drive axle weight of 8,000 lbs., a first trailer axle weight of 5,000 lbs., a dolly axle weight of 8,000 lbs., and a second trailer axle weight of 5,000 lbs. to a stopping distance or 41 meters for an initial nominal speed of 90 kph prior to effecting the stopping operation with the example combination vehicle 422 having this first loadcase. In addition, a further vehicle configuration database 420z may store data relating a further specific loadcase of a steering axle weight of 8400 lbs., a drive axle weight of 5,000 lbs., a dolly axle weight of 5,000 lbs., and a second trailer axle weight of 8,000 lbs. to a stopping distance or 81 meters for the nominal initial speed of 90 kph prior to effecting the stopping operation with the example combination vehicle 422 having this further loadcase.

Additional vehicle configuration databases 420b-420y are provided in the database 270 for storing the dynamic braking capability of the example combination vehicle 422 having varied loadcases stored in relation to the corresponding predicted or observed stopping distances wherein the a same overall gross load is arranged differently in the first and second trailers 426, 428 and wherein different and varied overall gross loads are arranged differently in the first and second trailers 426, 428 of the example combination vehicle 422.

FIG. 5 shows example details of selected ones of the second set 420 of vehicle configuration databases 420a-420z provided in the database 270 illustrated in FIG. 4 for storing the dynamic braking capability of the example combination vehicle 422 having a tractor 424 pulling first and second trailers 426, 428. In this example, the example combination vehicle 422 has a steering axle load sensor 264 (FIG. 2) developing a steering axle load signal converted by the data collection and communication module portion 200 of the electronic dynamic braking capability determination control system 12 into steering axle load data stored in the table 420 for the various loadcases illustrated 420a, 420b, 420c, 420h, and 420p at column 520.

The example combination vehicle 422 also has a set of vehicle load sensors 220 including a drive axle load sensor 220a developing a drive axle load signal in turn converted to drive axle load data stored in the table 420 for the various loadcases at column 530, a first trailer axle load sensor 220b developing a first trailer axle load signal in turn converted to first trailer axle load data stored in the table 420 for the various loadcases at column 540, a dolly axle load sensor 220c developing a dolly axle load signal in turn converted to dolly axle load data stored in the table 420 for the various loadcases at column 550, and a second trailer axle load sensor 220d developing a second trailer axle load signal in turn converted to second trailer axle load data stored in the table 420 for the various loadcases at column 560.

In the first vehicle configuration database 420a provided in the database 270 for the first loadcase of the example combination vehicle 422, the loaded vehicle has a gross vehicle weight (GCVW) of about 32,500 lbs. as shown in the data stored in column 570. The 32,500 lbs. load is arranged in the example combination vehicle 422 for the first loadcase 420a which, together with the mass of the vehicle, presents as different loads at the various load sensors, wherein the steering axle has a load of about 8400 lbs. as shown in the data stored in column 570 of the table 420a, the drive axle has a load of about 8400 lbs. as shown in the data stored in column 570 of the table 420a, the first trailer axle has a load of about 5500 lbs. as shown in the data stored in column 570 of the table 420a, the dolly axle has a load of about 5100 lbs. as shown in the data stored in column 570 of the table 420a, and the second trailer axle has a load of about 4900 lbs. as shown in the data stored in column 570 of the table 420a.

The example combination vehicle 422 for the first loadcase 420a requires about 41.5 meters to stop as shown in the data in column 590 when having an initial speed of about 90 kph.

Similarly, in the second vehicle configuration database 420b provided in the database 270 for the second loadcase of the example combination vehicle 422, the loaded vehicle has a gross vehicle weight (GCVW) of about 39,600 lbs. as shown in the data stored in column 570. The 39,600 lbs. load is arranged in the example combination vehicle 422 for the first loadcase 420b which, together with the mass of the vehicle, presents as different loads at the various load sensors, wherein the steering axle has a load of about 8400 lbs. as shown in the data stored in column 570 of the table 420b, the drive axle has a load of about 8400 lbs. as shown in the data stored in column 570 of the table 420b, the first trailer axle has a load of about 12,700 lbs. as shown in the data stored in column 570 of the table 420b, the dolly axle has a load of about 5100 lbs. as shown in the data stored in column 570 of the table 420b, and the second trailer axle has a load of about 4900 lbs. as shown in the data stored in column 570 of the table 420*b*.

The example combination vehicle 422 for the second loadcase 420*b* requires about 45.1 meters to stop as shown in the data in column 590 when having an initial speed of about 90 kph.

Also similarly, in the third vehicle configuration database 420*c* provided in the database 270 for the third loadcase of the example combination vehicle 422, the loaded vehicle has a gross vehicle weight (GCVW) of about 46,700 lbs. as shown in the data stored in column 570. The 46,700 lbs. load is arranged in the example combination vehicle 422 for the third loadcase 420*c* which, together with the mass of the vehicle, presents as different loads at the various load sensors, wherein the steering axle has a load of about 8400 lbs. as shown in the data stored in column 570 of the table 420*c*, the drive axle has a load of about 8400 lbs. as shown in the data stored in column 570 of the table 420*c*, the first trailer axle has a load of about 12,700 lbs. as shown in the data stored in column 570 of the table 420*c*, the dolly axle has a load of about 5100 lbs. as shown in the data stored in column 570 of the table 420*c*, and the second trailer axle has a load of about 12,100 lbs. as shown in the data stored in column 570 of the table 420*c*.

The example combination vehicle 422 for the third loadcase 420*c* requires about 46.5 meters to stop as shown in the data in column 590 when having an initial speed of about 90 kph.

Still also similarly, in the fourth vehicle configuration database 420*h* provided in the database 270 for the fourth loadcase of the example combination vehicle 422, the loaded vehicle has a gross vehicle weight (GCVW) of about 61,100 lbs. as shown in the data stored in column 570. The 61,100 lbs. load is arranged in the example combination vehicle 422 for the fourth loadcase 420*h* which, together with the mass of the vehicle, presents as different loads at the various load sensors, wherein the steering axle has a load of about 8380 lbs. as shown in the data stored in column 570 of the table 420*h*, the drive axle has a load of about 8160 lbs. as shown in the data stored in column 570 of the table 420*h*, the first trailer axle has a load of about 21,700 lbs. as shown in the data stored in column 570 of the table 420*h*, the dolly axle has a load of about 17,400 lbs. as shown in the data stored in column 570 of the table 420*h*, and the second trailer axle has a load of about 54,000 lbs. as shown in the data stored in column 570 of the table 420*h*.

The example combination vehicle 422 for the fourth loadcase 420*h* requires about 60.3 meters to stop as shown in the data in column 590 when having an initial speed of about 90 kph.

Yet still also similarly, in the fifth vehicle configuration database 420*p* provided in the database 270 for the fifth loadcase of the example combination vehicle 422, the loaded vehicle has a gross vehicle weight (GCVW) of about 61,100 lbs. as shown in the data stored in column 570. The 61,100 lbs. load is arranged in the example combination vehicle 422 for the fifth loadcase 420*p* which, together with the mass of the vehicle, presents as different loads at the various load sensors, wherein the steering axle has a load of about 9,530 lbs. as shown in the data stored in column 570 of the table 420*p*, the drive axle has a load of about 20,800 lbs. as shown in the data stored in column 570 of the table 420*p*, the first trailer axle has a load of about 7,060 lbs. as shown in the data stored in column 570 of the table 420*p*, the dolly axle has a load of about 11,300 lbs. as shown in the data stored in column 570 of the table 420*p*, and the second trailer axle has a load of about 12,300 lbs. as shown in the data stored in column 570 of the table 420*p*.

The example combination vehicle 422 for the fifth loadcase 420*p* requires about 46.5 meters to stop as shown in the data in column 590 when having an initial speed of about 90 kph.

Figure 6:
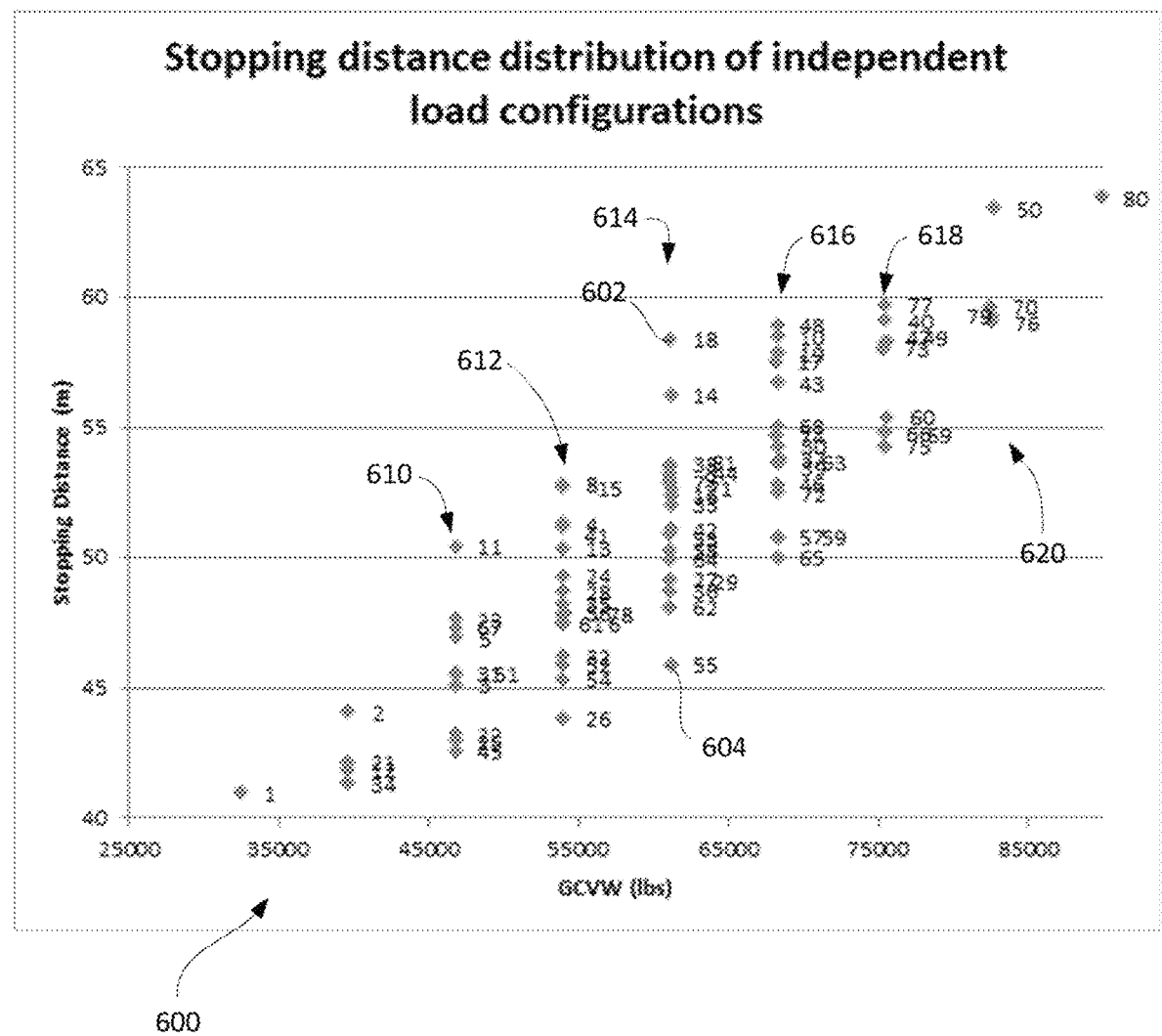
FIG. 6 is a graph plotting stopping distance versus gross vehicle weight for an example selected particular vehicle configuration using data drawn from the example database of FIG. 4.

FIG. 6 is a graph 600 plotting stopping distance versus gross vehicle weight for an example selected particular vehicle configuration 422 using data 420 drawn from the example database 270 of FIGS. 2 and 4. With reference now to that Figure, the graph 600 plots as single points averages of a large number of loadcases from the database 270 including for example a first graph point 602 for the fourth loadcase 420*h* and a second graph point 604 for the fifth loadcase 420*p*. As described above, the loadcases of the example combination vehicle 422 may be grouped or otherwise collected and/or developed in terms of loaded vehicle gross vehicle weight (GCVW).

This is reflected in the graph 600 wherein the predicted stopping distances of example combination vehicle 422 having a GCVW of about 47,000 lbs. but having different load distribution arrangements are represented by a first group or cluster of points 610. Similarly, the graph reflects the predicted stopping distances of the example combination vehicle 422 having a GCVW of about 54,000 lbs. but having different load distribution arrangements are represented by a second group or cluster of points 612, of the example combination vehicle 422 having a GCVW of about 61,000 lbs. but having different load distribution arrangements are represented by a third group or cluster of points 614, of the example combination vehicle 422 having a GCVW of about 69,000 lbs. but having different load distribution arrangements are represented by a fourth group or cluster of points 616.

First to be observed from the Figure is that the graph 600 plots a generally upwardly directed average stopping distance versus gross vehicle load profile 620. This might be somewhat expected as a given combination vehicle travelling at an initial speed of about 90 kph would require more distance to stop as the overall loading of the vehicle increases. However, and as next to be observed from the graph 600 is that the load distribution for any given load can profoundly affect the expected stopping distance of the vehicle. For example, the example combination vehicle 422 having a GCVW of about 61,000 lbs. but having different load distribution arrangements can be expected to stop having an initial speed of about 90 kph in about 46.5 meters for the fifth loadcase 420*p* shown in the graph 600 at point 604, while requiring about 60.3 meter stopping distance for the fourth loadcase 420*h* shown in the graph 600 at point 602.

In accordance with an example embodiment herein, therefore, a system 12 is provided for determining a dynamic braking capability of an associated combination vehicle 10, 20, 412, 422 including a tractor 414, 424 and at least one trailer 416, 426, 428, the tractor having at least one drive axle and a steering axle, and the at least one trailer having at least one trailer axle. The system of the example embodiment comprises a control unit 200, 300 configured to be disposed in the associated combination vehicle, wherein the control unit comprises a processor 230, 304, a non-transient memory device 240, 306, 308, 310 operatively coupled with the processor, logic 241 stored in the non-transient memory device, a vehicle load input operatively coupled with the control unit, and a vehicle stopping distance table stored in the non-transient memory device, wherein the logic is executable by the processor to process one or more signals received from the combination vehicle to determine the dynamic braking capability of the associated combination vehicle. In the example embodiment, the vehicle stopping distance table 420 stored in the non-transient memory device comprises table data 410, 420 mapping vehicle operating condition lookup data to stopping distance output data. The vehicle operating condition lookup data is preferably representative of a vehicle operating condition of the associated combination vehicle and the stopping distance output data being representative of an estimated stopping distance required to stop the associated combination vehicle travelling having the vehicle operating condition. The vehicle load input operatively coupled with the control unit is operable to receive a vehicle load signal representative of a sensed load on one or more of the at least one drive axle of the tractor of the associated combination vehicle, the steering axle of the tractor of the associated combination vehicle, and/or the at least one trailer axle of the at least one trailer of the associated combination vehicle, and to generate vehicle load data representative of the sensed load based on the received vehicle load signal. The logic of the control unit is executable by the processor to determine vehicle operating condition data in accordance with the vehicle load data, apply the determined vehicle operating condition data as the vehicle operating condition lookup data to the vehicle stopping distance table stored in the non-transient memory device, retrieve predicted stopping distance output data mapped relative to the determined vehicle operating condition data by the vehicle stopping distance table, the retrieved predicted stopping distance output data being representative of a predicted stopping distance of the associated combination vehicle based on the determined vehicle operating condition data applied to the vehicle stopping distance table, and determine the dynamic braking capability of the associated combination vehicle as the predicted stopping distance.

It is to be appreciated that a plurality of vehicle stopping distance tables are stored in the non-transient memory device as may be necessary or desired, wherein each of the plurality of vehicle stopping distance tables comprises particular vehicle table data mapping particular vehicle operating condition lookup data of a particular vehicle combination vehicle configuration to a corresponding particular stopping distance output data of the particular vehicle combination vehicle configuration. In the example embodiment, the logic of the control unit is executable by the processor to determine a configuration of the associated combination vehicle, select a vehicle stopping distance table from among the plurality of vehicle stopping distance tables in accordance with the determined configuration of the associated combination vehicle, and determine the vehicle operating condition data in accordance with the vehicle load data. The logic of the control unit is further executable by the processor to apply the determined vehicle operating condition data as the vehicle operating condition lookup data to the selected vehicle stopping distance table, retrieve the predicted stopping distance data mapped relative to the determined vehicle operating condition data by the selected vehicle stopping distance table, and determine the dynamic braking capability of the associated combination vehicle as the predicted stopping distance retrieved from the selected vehicle stopping distance table.

It is to be appreciated that a vehicle load sensor input 220 is provided at the drive axle set in a minimum configuration of the example embodiment. However, more sensors may be used as necessary and/or desired such as for example the sensors 220a-220d shown in FIG. 4. In an embodiment, the vehicle load input may include a drive axle load sensor device operatively coupled with the control unit, a steering axle load sensor device operatively coupled with the control unit, and a trailer axle load sensor device operatively coupled with the control unit. In this example embodiment, the drive axle load sensor device is configured to be disposed at the at least one drive axle of the associated combination vehicle, and is operable to receive a vehicle drive axle load signal representative of a sensed load on the at least one drive axle of the tractor of the associated combination vehicle, generate vehicle drive axle load data representative of the received vehicle drive axle load signal, and transmit the vehicle drive axle load data to the control unit.

Further in this example embodiment, the steering drive axle load sensor device is configured to be disposed at the steering axle of the associated combination vehicle, and is operable to receive a vehicle steering axle load signal representative of a sensed load on the steering axle of the tractor of the associated combination vehicle, generate vehicle steering axle load data representative of the received vehicle steering axle load signal, and transmit the vehicle steering axle load data to the control unit.

Yet still further in this example embodiment, the trailer axle load sensor device is configured to be disposed at the at least one trailer axle of the associated combination vehicle, and is operable to receive a trailer axle load signal representative of a sensed load on the at least one trailer axle of the at least one trailer of the associated combination vehicle, generate trailer axle load data representative of the received trailer axle load signal, and transmit the trailer axle load data to the control unit.

Still yet further in this example embodiment, the logic of the control unit is executable by the processor to determine the vehicle operating condition data in accordance with the vehicle drive axle load data, the vehicle steering axle load data, and trailer axle load data, and determine the dynamic braking capability of the associated combination vehicle by applying the determined vehicle operating condition data as the vehicle operating condition lookup data to the vehicle stopping distance table stored in the non-transient memory device.

In a further example embodiment, one or more of the drive axle load sensor device, the steering axle load sensor device, and/or the trailer axle load sensor device comprise a wireless transmitter configured to wirelessly transmit the vehicle drive axle load data, the vehicle steering axle load data, and/or the trailer axle load data to the transceiver device 250 of the control unit 200, respectively.

In still yet a further example embodiment, the axle loading information may be obtained from a source external to the combination vehicle itself such as, for example, from a weigh station. In this example embodiment, the vehicle load input comprises a wireless receiver device 250 operatively coupled with the control unit 200 and configured to be disposed in the associated combination vehicle. The wireless receiver device 250 is in selective operative communication with an associated weigh station transmitter of an associated vehicle weigh station system, and is operable to receive from the weigh station transmitter of the associated vehicle weigh station system the vehicle load signal representative of the sensed load distribution on the one or more of the at least one drive axle of the tractor of the associated combination vehicle, the steering axle of the tractor of the associated combination vehicle, and/or the at least one trailer axle of the at least one trailer of the associated combination vehicle, generate the vehicle load data representative of the received vehicle load signal, and deliver the generated vehicle load data to the control unit.

In still yet a further example embodiment, the system further includes a wireless receiver device coupled with the control unit and a wireless transmitter device also coupled with the control unit. The wireless receiver and transmitter devices may for example be combined as a transceiver device 250 coupled with the control unit 230.

In use, the wireless receiver device is in operative communication with a first associated other combination vehicle travelling with the associated combination vehicle on the associated roadway, wherein the wireless receiver device receives a first dynamic braking capability signal from the first associated other combination vehicle.

Similarly in use, the wireless transmitter device is in operative communication with the first associated other combination vehicle travelling with the associated combination vehicle on the associated roadway.

In an example embodiment, the logic 241 is executable by the processor of the control unit 230 of the associated combination vehicle to compare the first dynamic braking capability signal received from the first associated other combination vehicle with the dynamic braking capability of the associated combination vehicle to determine a capability of collaborative platooning between the associated combination vehicle and the first associated other combination vehicle based on the comparison. The wireless transmitter device is operable to transmit a platooning permit signal to the first associated other combination vehicle for initiating the collaborative platooning between the associated combination vehicle and the first associated other combination vehicle.

In a further example embodiment, the logic 241 is executable by the processor of the control unit 230 of the associated combination vehicle compare the first dynamic braking capability signal received from the first associated other combination vehicle with the dynamic braking capability of the associated combination vehicle to determine a collaborative platooning vehicle ordering during collaborative platooning between the associated combination vehicle and the first associated other combination vehicle based on the comparison. The wireless transmitter device is operable to transmit a platooning vehicle ordering signal to the first associated other combination vehicle for establishing the vehicle platoon ordering during the collaborative platooning between the associated combination vehicle and the first associated other combination vehicle.

In a still further example embodiment, the logic 241 is executable by the processor of the control unit 230 of the associated combination vehicle compare the first dynamic braking capability signal received from the first associated other combination vehicle with the dynamic braking capability of the associated combination vehicle to determine a platooning gap distance to be maintained between the associated combination vehicle and the first associated other combination vehicle during collaborative platooning between the associated combination vehicle and the first associated other combination vehicle based on the comparison. The wireless transmitter device is operable to transmit a platooning gap distance signal to the first associated other combination vehicle for establishing the platooning gap distance to be maintained between the associated combination vehicle and the first associated other combination vehicle during collaborative platooning between the associated combination vehicle and the first associated other combination vehicle based on the comparison.

In accordance with further example embodiments, the determinations of the capability of collaborative platooning between the associated combination vehicle and the first associated other combination vehicle, or of a platoon vehicle ordering or ranking during the collaborative platooning, or of inter-vehicle gap distance(s) to be maintained during the collaborative platooning, need not be made locally by the processor of the control unit 230 of the associated combination vehicle. In this regard and in accordance still yet a further example embodiment, the wireless transmitter and/or receiver devices or equivalently the transceiver device may for example be in operative wireless communication with one or more remote fleet management facilities, Central Command Centers (CCC), Network Operations Centers (NOC), or the like via a remote wireless communication system 50 and/or a remote satellite system 60 for the determination of the collaborative platooning parameters to be made remote from the associated combination vehicle and at a fleet management facility, or the like.

In an embodiment the determination of the capability of collaborative platooning between the associated combination vehicle and the first associated other combination vehicle is made at an associated remote fleet management system in operative wireless communication with the transmitter and receiver devices of the control unit disposed in the associated vehicle. In the example embodiment, the wireless transmitter device is controlled by the processor of the control unit executing logic stored in a memory device to transmit the determined dynamic braking capability of the associated combination vehicle to the associated remote fleet management system. Similarly, the wireless receiver device is operated by the processor of the control unit executing the logic stored in the memory device. The wireless receiver device receives a platooning permit signal from the associated remote fleet management system for initiating collaborative platooning between the associated combination vehicle and a first associated other combination vehicle travelling with the associated combination vehicle on the associated roadway. In the embodiment, the platooning permit signal is representative of a capability of the collaborative platooning between the associated combination vehicle and the first associated other combination vehicle as determined by the associated remote fleet management system based on a comparison made by the associated remote fleet management system of a dynamic braking capability of the first associated other combination vehicle with the dynamic braking capability of the associated combination vehicle transmitted to the associated remote fleet management system by the wireless transmitter device of the associated combination vehicle.

In a further embodiment, the determination of platoon vehicle ordering or ranking during collaborative platooning between the associated combination vehicle and the first associated other combination vehicle is made at an associated remote fleet management system in operative wireless communication with the transmitter and receiver devices of the control unit disposed in the associated vehicle. In the example embodiment, the wireless transmitter device is controlled by the processor of the control unit executing logic stored in a memory device to transmit the determined dynamic braking capability of the associated combination vehicle to the associated remote fleet management system. Similarly, the wireless receiver device is operated by the processor of the control unit executing the logic stored in the memory device. The wireless receiver device receives a platooning vehicle ordering signal from the associated remote fleet management system for specifying a vehicle ordering during collaborative platooning between the associated combination vehicle and a first associated other combination vehicle travelling with the associated combination vehicle on the associated roadway. In the embodiment, the platooning vehicle ordering signal is representative of an ordering or platoon ranking to be followed by the associated combination vehicle relative to the first associated other combination vehicle during the collaborative platooning as determined by the associated remote fleet management system based on a comparison of a dynamic braking capability of the first associated other combination vehicle with the dynamic braking capability of the associated combination vehicle transmitted to the associated remote fleet management system by the wireless transmitter device of the associated combination vehicle.

In a further embodiment, the determination of an inter-vehicle gap distance to be maintained during collaborative platooning between the associated combination vehicle and the first associated other combination vehicle is made at an associated remote fleet management system in operative wireless communication with the transmitter and receiver devices of the control unit disposed in the associated vehicle. In the example embodiment, the wireless transmitter device is controlled by the processor of the control unit executing logic stored in a memory device to transmit the determined dynamic braking capability of the associated combination vehicle to the associated remote fleet management system. Similarly, the wireless receiver device is operated by the processor of the control unit executing the logic stored in the memory device. The wireless receiver device receives a platooning gap distance signal from the associated remote fleet management system for setting an inter-vehicle gap distance to be maintained during collaborative platooning between the associated combination vehicle and a first associated other combination vehicle. In the embodiment, the platooning vehicle ordering signal is representative of a distance to be maintained by the associated combination vehicle relative to the first associated other combination vehicle during the collaborative platooning as determined by the associated remote fleet management system based on a comparison of a dynamic braking capability of the first associated other combination vehicle with the dynamic braking capability of the associated combination vehicle transmitted to the associated remote fleet management system by the wireless transmitter device of the associated combination vehicle.

In still yet a further example embodiment such as in for example combination vehicles having only a single load sensor at the tractor drive axle set, the axle loading information may be determined based on the load signal from the axle load sensor input 220 in combination with other information obtained from other inputs such as vehicle speed and engine torque signals wherein an overall vehicle mass may be determined and the overall mass allocated to the steering axle and trailer axle(s) appropriately. In this regard, the system according to a further example embodiment includes vehicle speed and torque sensor inputs operatively coupled with the control unit. The vehicle speed sensor input is operable to receive a vehicle speed signal representative of a sensed speed of the associated combination vehicle traveling on an associated roadway, and generate vehicle speed data representative of the sensed speed based on the received vehicle speed signal. The vehicle torque sensor input is operable to receive a torque signal representative of a sensed torque between the associated combination vehicle and the associated roadway during a change in speed of the associated combination vehicle relative to the associated roadway, and generate torque data representative of the sensed torque based on the received torque signal. Further in this example embodiment, the logic of the control unit is executable by the processor to generate combination vehicle gross mass data in accordance with a predetermined combination of the torque data with the vehicle speed data, wherein the combination vehicle gross mass data is representative of a gross vehicle weight of the combination vehicle. The logic of the control unit is further executable by the processor to determine the dynamic braking capability of the associated combination vehicle by applying the combination vehicle gross mass data as the vehicle operating condition data to the vehicle stopping distance table.

In a particular example embodiment, the vehicle load sensor 220 may be an air pressure sensor device operatively coupled with the vehicle load input. The pressure sensor device senses a pressure in a suspension air bag of the tractor of the associated combination vehicle and generates the vehicle load signal representative of the sensed pressure as a load on the at least one drive axle of the tractor of the associated combination vehicle.

With the overall vehicle mass in hand as set out above, the logic of the control unit of an embodiment of the subject system is executable by the processor to provide vehicle steering axle load data representative of a load on the steering axle of the tractor of the combination vehicle, and to determine vehicle trailer axle load data in accordance with a predetermined combination of the combination vehicle gross mass data, the vehicle drive axle load data, and the vehicle steering axle load data. The logic of the control unit is further executable by the processor to determine the dynamic braking capability of the associated combination vehicle by applying as the vehicle operating condition data a combination of the vehicle drive axle load data, the vehicle steering axle load data, and the vehicle trailer axle load data to the vehicle stopping distance table.

In a further particular example embodiment, the system may be in operative communication with an associated electronic command module (ECM) of the tractor of the associated combination vehicle for receiving one or more signals and/or data for indirectly determining the vehicle operating condition data in accordance with an inferred vehicle load to determine the dynamic braking capability of the associated combination vehicle as the predicted stopping distance. In the example embodiment, the vehicle speed sensor input comprises a vehicle speed signal input connection of the control unit in operative communication with a vehicle speed signal output connection of an associated electronic command module (ECM) of the tractor of the associated combination vehicle. The vehicle speed signal input connection of the control unit receives the vehicle speed signal from the vehicle speed signal output connection of the associated ECM of the tractor of the associated combination vehicle. In addition, the vehicle load input comprises a load signal input connection of the control unit in operative communication with a vehicle load output connection of the associated ECM of the tractor of the associated combination vehicle. The load signal input connection of the control unit receives the vehicle load signal from the vehicle load output connection of the associated ECM of the tractor of the associated combination vehicle. In further addition, the vehicle torque sensor input comprises a torque signal input connection of the control unit in operative communication with a vehicle torque output connection of the associated ECM of the tractor of the associated combination vehicle. The torque signal input connection of the control unit receives the torque signal from the vehicle torque output connection of the associated ECM of the tractor of the associated combination vehicle. In that way, the logic of the control unit is further executable by the processor to determine the dynamic braking capability of the associated combination vehicle by applying the one or more signals and/or data received from the associated ECM of the tractor of the associated combination vehicle.

In the example embodiment, a single load sensor may be provided at the drive axle set of the tractor of the associated combination vehicle. The vehicle load input comprises a drive axle load sensor operatively coupled with the control unit and configured to be disposed at the at least one drive axle of the associated combination vehicle. The drive axle load sensor operates to receive a vehicle drive axle load signal representative of a sensed load on the at least one drive axle of the tractor of the associated combination vehicle, and generate vehicle drive axle load data representative of the sensed load based on the received vehicle drive axle load signal. The logic of the control unit is executable by the processor to determine vehicle steering axle load data in accordance with a predetermined combination of the combination vehicle gross mass data and the vehicle drive axle load data, and further to determine vehicle trailer axle load data in accordance with a predetermined combination of the combination vehicle gross mass data, the vehicle drive axle load data, and the vehicle steering axle load data.

In the example embodiment, in particular, the logic of the control unit is executable by the processor to determine Axle Load Allocation Factor (ALAF) data in accordance with a predetermined combination of the vehicle trailer axle load data, the vehicle drive axle load data, and the vehicle steering axle load data in accordance with:

$$ALAF = \frac{(DriveAxle_{loading} - TrailerAxle_{loading})}{(SteeringAxle_{loading} + DriveAxle_{loading} + TrailerAxler_{loading})}$$

where:

$DriveAxle_{loading}$ comprises the vehicle drive axle load data;

$TrailerAxle_{loading}$ comprises the vehicle trailer axle load data; and $SteeringAxle_{loading}$ comprises the vehicle steering axle load data.

The logic of the control unit is executable by the processor to determine the dynamic braking capability of the associated combination vehicle by applying the determined ALAF data as the vehicle operating condition data to the vehicle stopping distance table.

Figure 7:
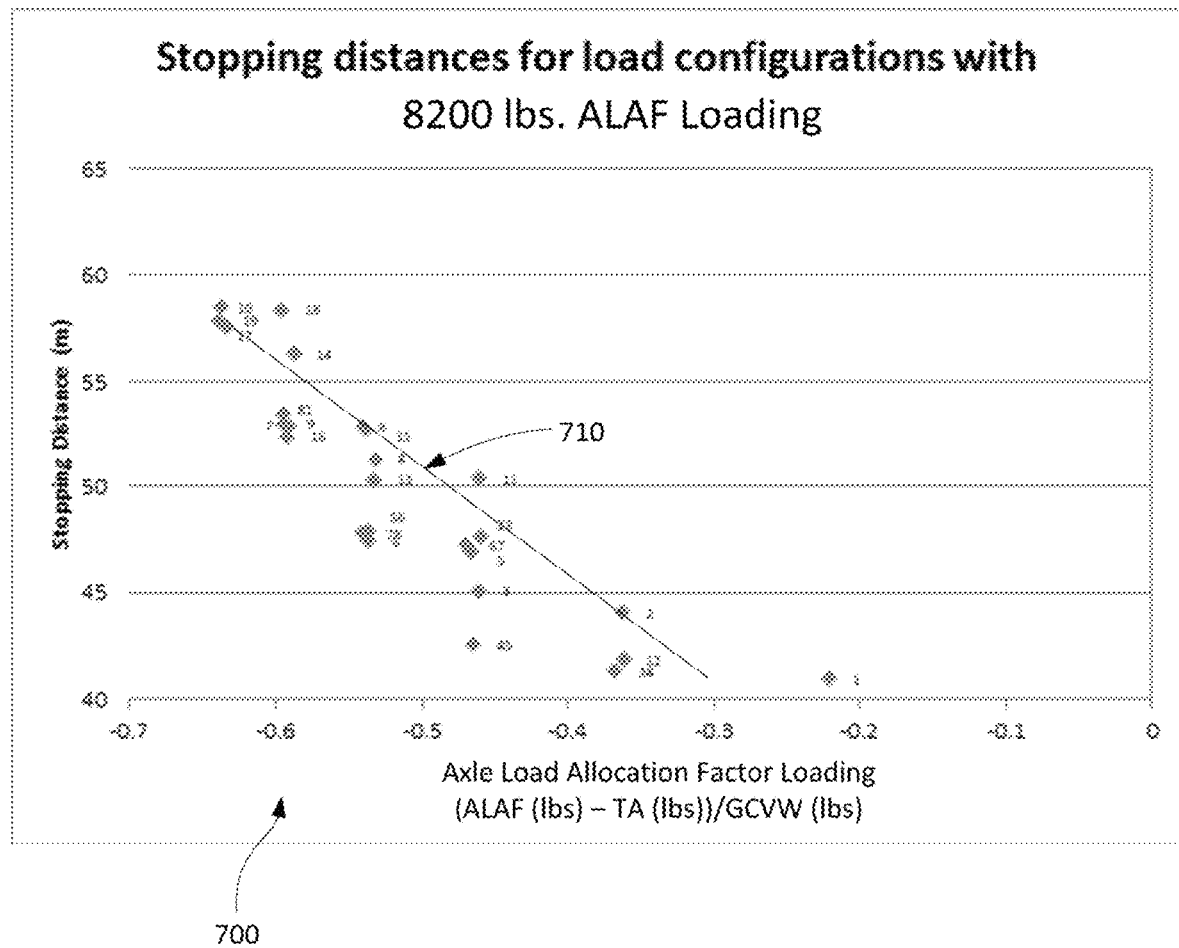
FIG. 7 is a graph plotting stopping distance versus a calculated Axle Load Allocation Factor (ALAF) of 8200 lbs. for an example selected particular vehicle configuration.

FIG. 7 is a graph 700 plotting stopping distance versus a calculated ALAF of 8200 lbs. for an example selected particular vehicle configuration 422 using data 420 drawn from the example database 270 of FIGS. 2 and 4. With reference now to that Figure, the graph 700 plots as single points averages of a large number of loadcases from the database. As described above, the loadcases of the example combination vehicle 422 may be grouped or otherwise collected and/or developed in terms of loaded vehicle gross vehicle weight (GCVW). The graph 700 shows a curve 710 that is used in the example embodiment for determining the dynamic braking capability of the associated combination vehicle by applying the determined ALAF data for particular vehicle configurations having an ALAF of 8,200 lbs. as the vehicle operating condition data to the vehicle stopping distance table.

Figure 8:
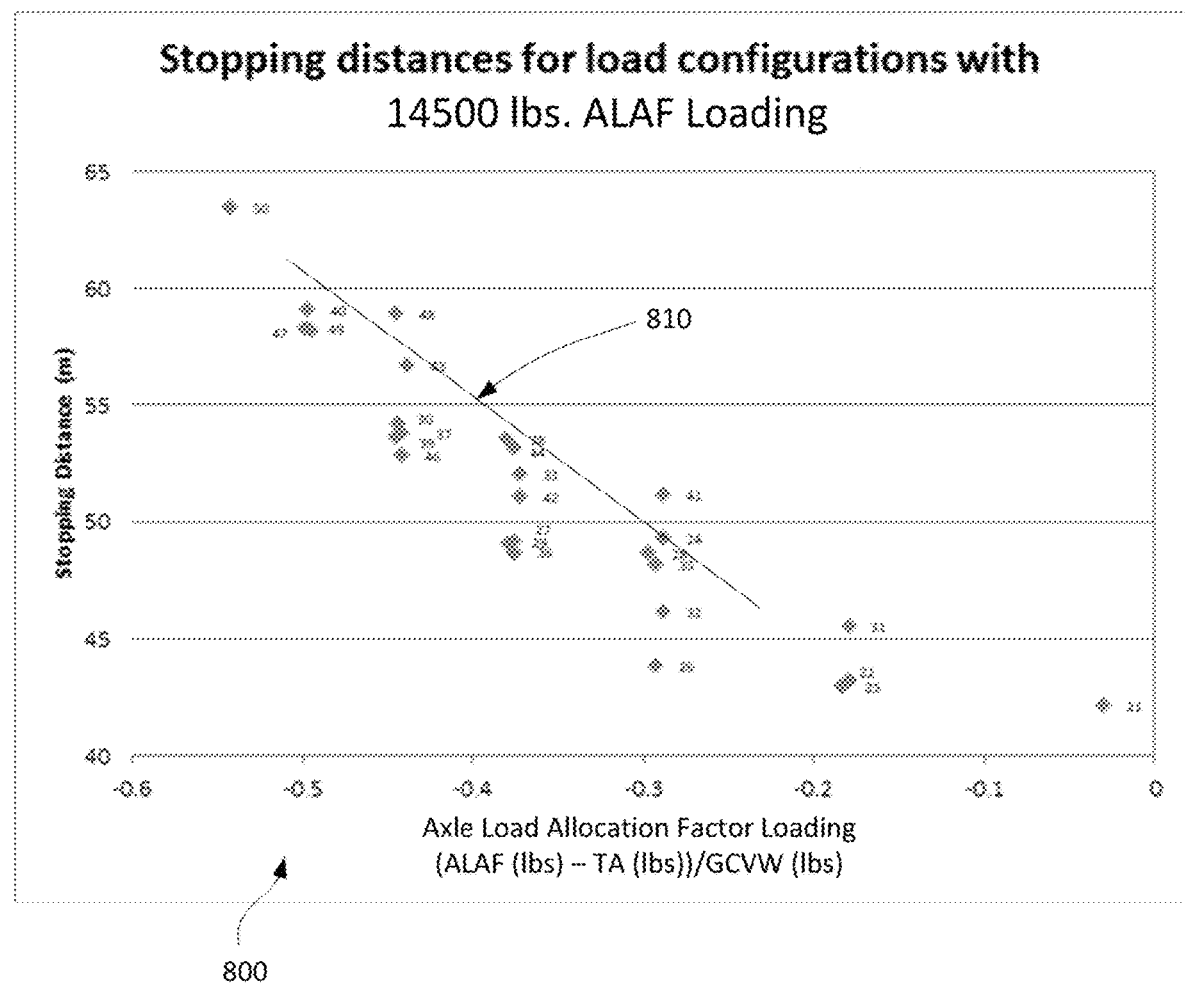
FIG. 8 is a graph plotting stopping distance versus a calculated ALAF of 14,500 lbs. for an example selected particular vehicle configuration.

FIG. 8 is a graph 800 plotting stopping distance versus a calculated ALAF of 14,500 lbs. for an example selected particular vehicle configuration 422 using data 420 drawn from the example database 270 of FIGS. 2 and 4. With reference now to that Figure, the graph 800 plots as single points averages of a large number of loadcases from the database. As described above, the loadcases of the example combination vehicle 422 may be grouped or otherwise collected and/or developed in terms of loaded vehicle gross vehicle weight (GCVW). The graph 800 shows a curve 810 that is used in the example embodiment for determining the dynamic braking capability of the associated combination vehicle by applying the determined ALAF data for particular vehicle configurations having an ALAF of 14,500 lbs. as the vehicle operating condition data to the vehicle stopping distance table.

Figure 9:
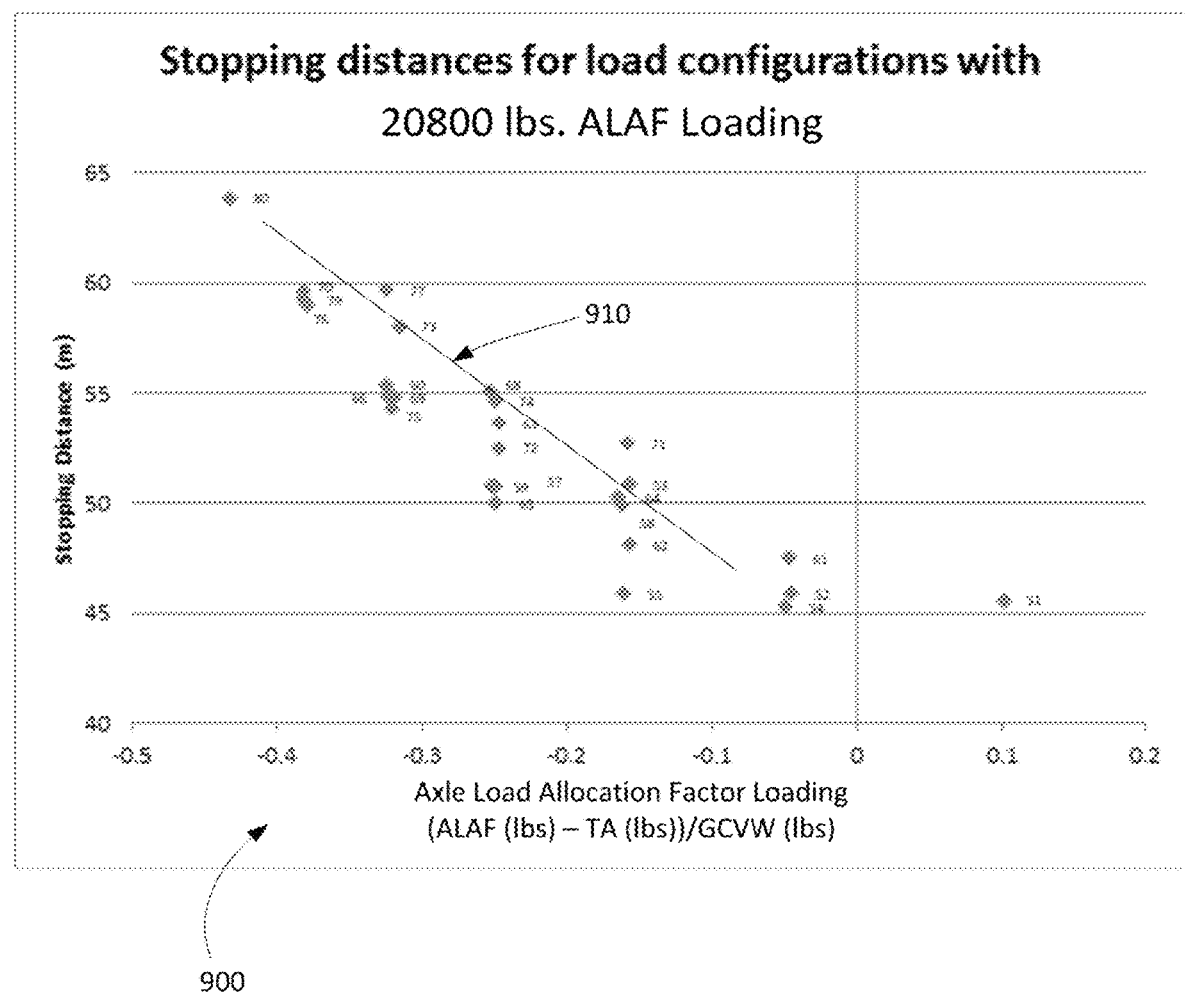
FIG. 9 is a graph plotting stopping distance versus a calculated ALAF of 20,800 lbs. for an example selected particular vehicle configuration.

FIG. 9 is a graph 900 plotting stopping distance versus a calculated ALAF of 20,800 lbs. for an example selected particular vehicle configuration 422 using data 420 drawn from the example database 270 of FIGS. 2 and 4. With reference now to that Figure, the graph 900 plots as single points averages of a large number of loadcases from the database. As described above, the loadcases of the example combination vehicle 422 may be grouped or otherwise collected and/or developed in terms of loaded vehicle gross vehicle weight (GCVW). The graph 900 shows a curve 910 that is used in the example embodiment for determining the dynamic braking capability of the associated combination vehicle by applying the determined ALAF data for particular vehicle configurations having an ALAF of 20,800 lbs. as the vehicle operating condition data to the vehicle stopping distance table.

Figure 10:
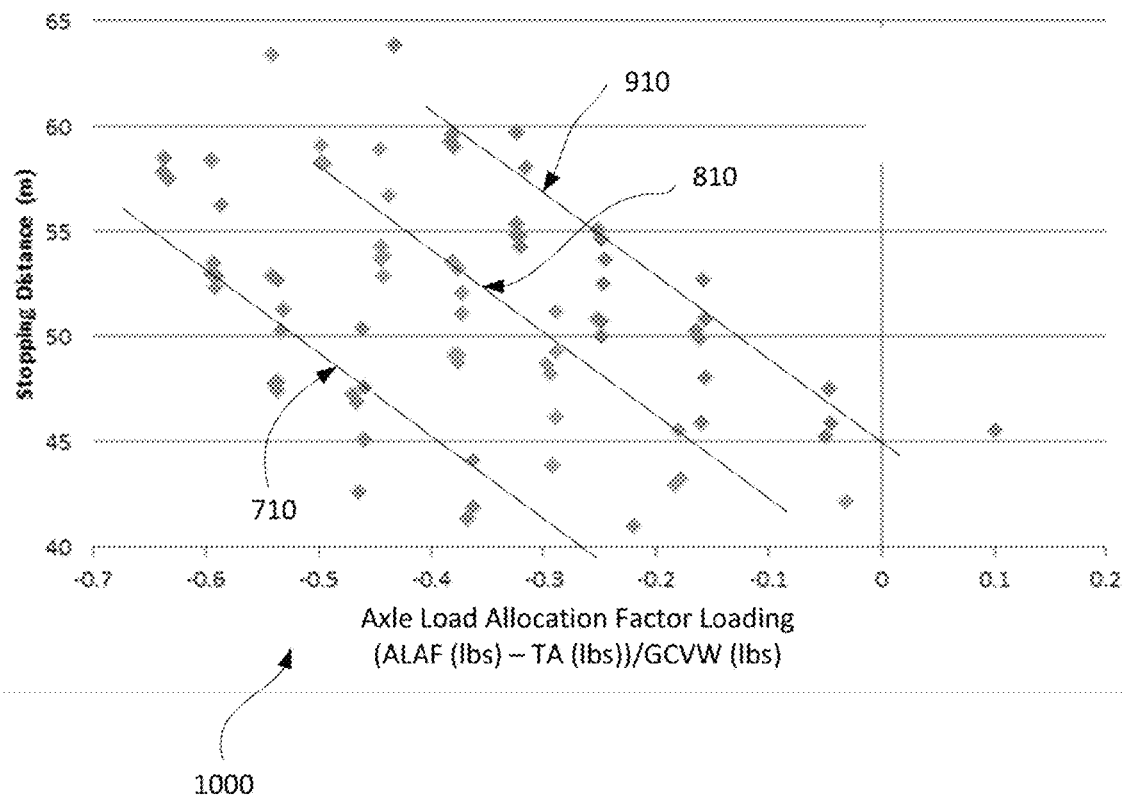
FIG. 10 is a graph plotting stopping distance versus calculated ALAFs of 8200 lbs., 20,800 lbs., and 14,500 lbs. for an example selected particular vehicle configuration.

FIG. 10 is a graph 1000 plotting stopping distance versus calculated ALAFs of 8200 lbs., 20,800 lbs., and 14,500 lbs. for an example selected particular vehicle configuration 422 using data 420 drawn from the example database 270 of FIGS. 2 and 4. With reference now to that Figure, the graph 1000 plots as single points averages of a large number of loadcases from the database. As described above, the loadcases of the example combination vehicle 422 may be grouped or otherwise collected and/or developed in terms of loaded vehicle gross vehicle weight (GCVW). The graph 1000 shows the curves 710, 810, and 910 of FIGS. 7, 8, and 9, respectively, that are used in the example embodiment for determining the dynamic braking capability of the associated combination vehicle by applying the determined ALAF data for particular vehicle configurations having ALAFs of 8200 lbs., 20,800 lbs., and 14,500 lbs. as the vehicle operating condition data to the vehicle stopping distance table.

Figure 11:
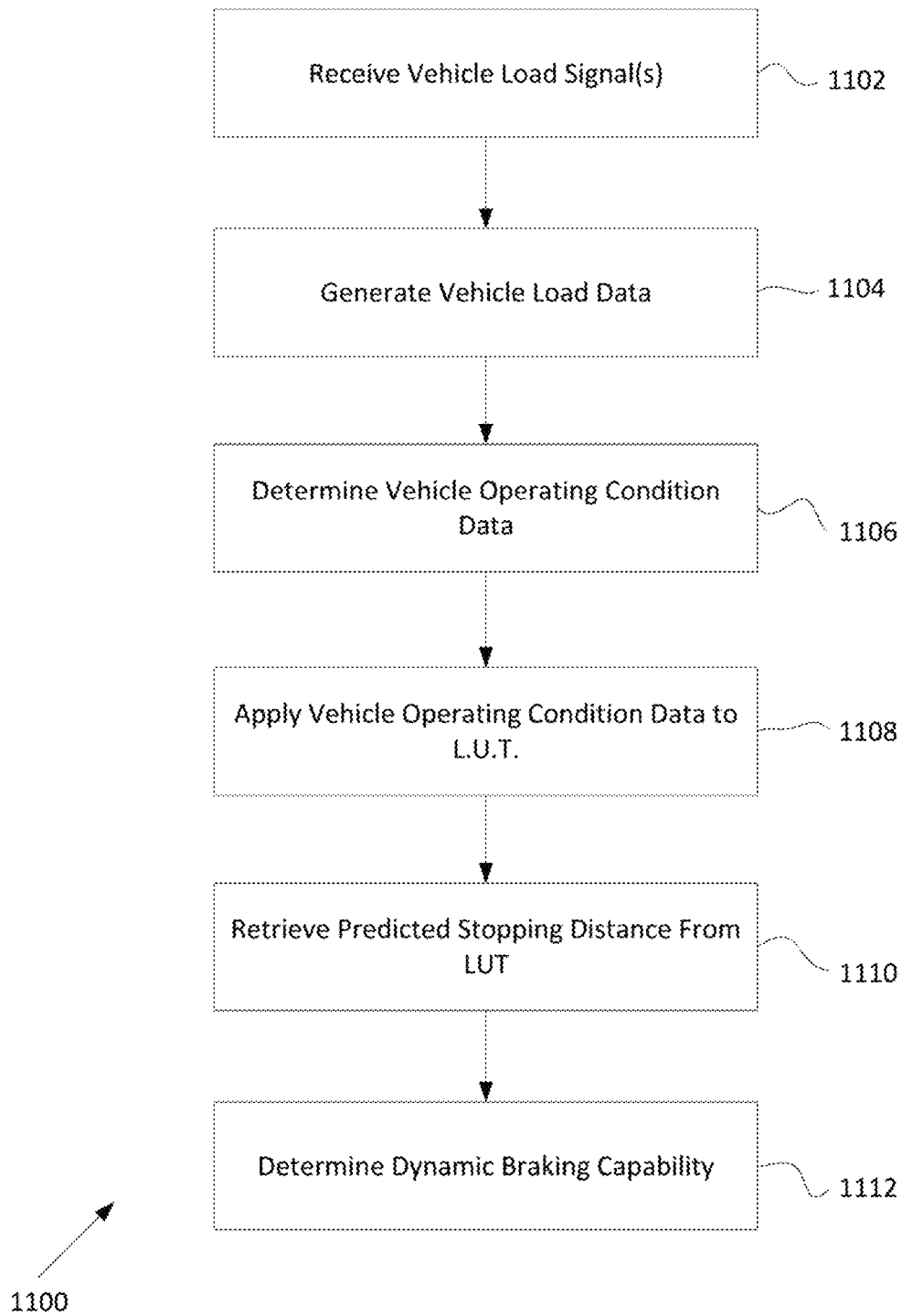
FIG. 11 is a flow diagram showing a method for determining a dynamic braking capability of an associated combination vehicle.

FIG. 11 is a flow diagram showing a method 1100 for determining a dynamic braking capability of an associated combination vehicle including a tractor having at least one drive axle and a steering axle, and at least one trailer having at least one trailer axle. With reference now to that Figure, a control unit is provided in the associated combination vehicle, wherein the control unit comprises a processor, a non-transient memory device operatively coupled with the processor, and logic stored in the non-transient memory device and being executable by the processor to determine the dynamic braking capability of the associated combination vehicle. A vehicle stopping distance table is stored in the non-transient memory device, wherein the vehicle stopping distance table comprises table data mapping vehicle operating condition lookup data to stopping distance output data, the vehicle operating condition lookup data being representative of a vehicle operating condition of the associated combination vehicle and the stopping distance output data being representative of an estimated stopping distance required to stop the associated combination vehicle travelling having the vehicle operating condition.

In step 1102, a vehicle load signal is received by a vehicle load input operatively coupled with the control unit. The vehicle load signal is representative of a sensed load on one or more of the at least one drive axle of the tractor of the associated combination vehicle, the steering axle of the tractor of the associated combination vehicle, and/or the at least one trailer axle of the at least one trailer of the associated combination vehicle.

In step 1104, vehicle load data is generating by the vehicle load input. The vehicle load data is representative of the sensed load based on the received vehicle load signal.

The logic is executed by the processor of the control unit in step 1106 to determine vehicle operating condition data in accordance with the vehicle load data.

The logic is executed by the processor of the control unit in step 1108 to apply the determined vehicle operating condition data as the vehicle operating condition lookup data to the vehicle stopping distance table stored in the non-transient memory device.

The logic is executed by the processor of the control unit in step 1110 to retrieve predicted stopping distance output data mapped relative to the determined vehicle operating condition data by the vehicle stopping distance table, the retrieved predicted stopping distance output data being representative of a predicted stopping distance of the associated combination vehicle based on the determined vehicle operating condition data applied to the vehicle stopping distance table.

The logic is executed by the processor of the control unit in step 1112 to determine the dynamic braking capability of the associated combination vehicle as the predicted stopping distance.

Figure 12:
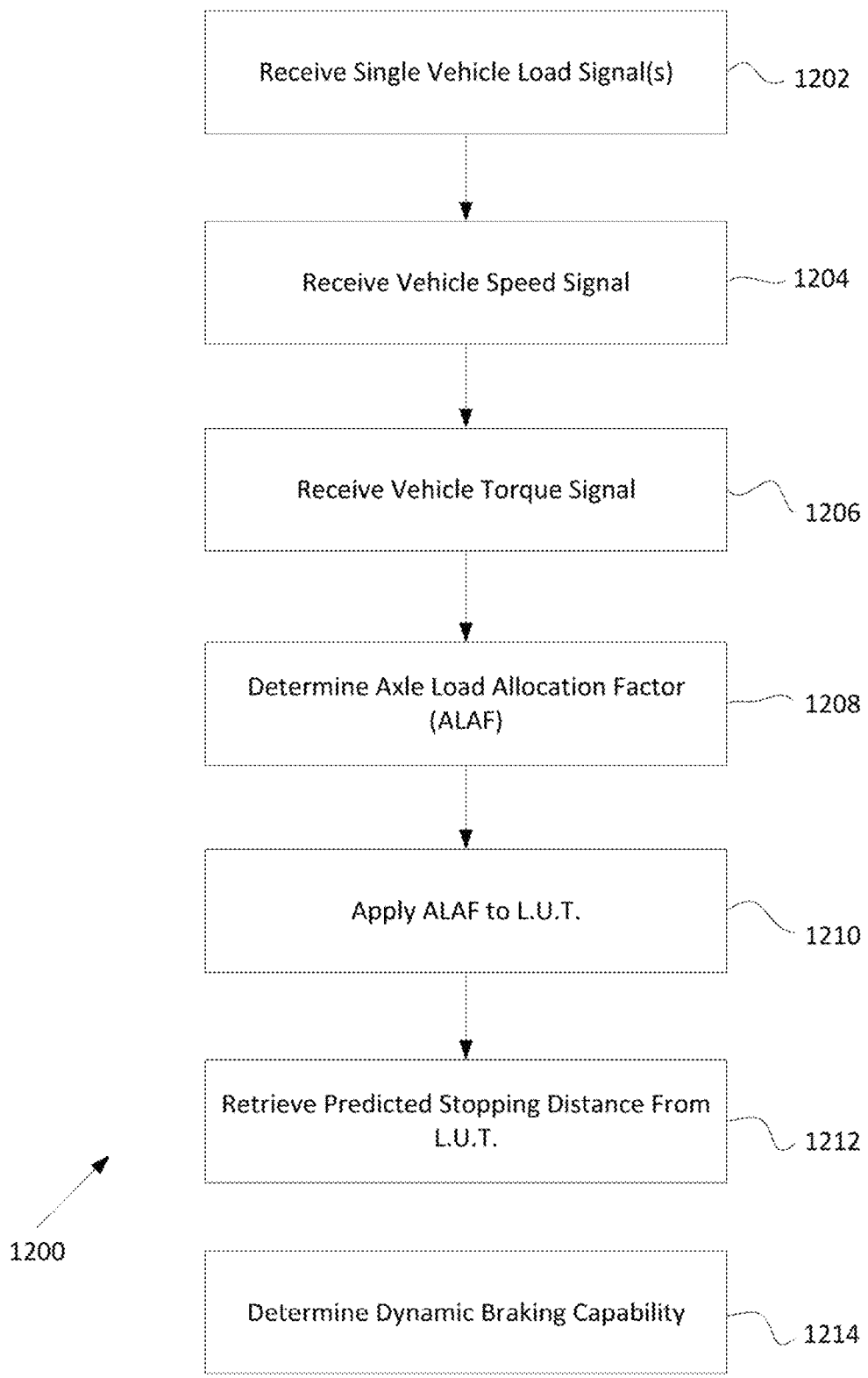
FIG. 12 is a flow diagram showing a method for determining a dynamic braking capability of an associated combination vehicle.

FIG. 12 is a flow diagram showing a method for determining a dynamic braking capability of an associated combination vehicle including a tractor having at least one drive axle and a steering axle, and at least one trailer having at least one trailer axle. With reference now to that Figure, a control unit is provided in the associated combination vehicle, wherein the control unit comprises a processor, a non-transient memory device operatively coupled with the processor, and logic stored in the non-transient memory device and being executable by the processor to determine the dynamic braking capability of the associated combination vehicle. A vehicle stopping distance table is stored in the non-transient memory device, wherein the vehicle stopping distance table comprises table data mapping vehicle operating condition lookup data to stopping distance output data, the vehicle operating condition lookup data being representative of a vehicle operating condition of the associated combination vehicle and the stopping distance output data being representative of an estimated stopping distance required to stop the associated combination vehicle travelling having the vehicle operating condition.

In step 1202, a single vehicle load signal is received by a vehicle load input from a drive axle load sensor input operatively coupled with the control unit. The vehicle load signal is representative of a sensed load on one or more of the at least one drive axle of the tractor of the associated combination vehicle, the steering axle of the tractor of the associated combination vehicle, and/or the at least one trailer axle of the at least one trailer of the associated combination vehicle.

In step 1204, a vehicle speed signal is received by a vehicle speed sensor input operatively coupled with the control unit. The vehicle speed signal is representative of a sensed speed of the associated combination vehicle traveling on an associated roadway.

In step 1206, a vehicle torque signal is received by a vehicle torque sensor input operatively coupled with the control unit. The vehicle torque signal is representative of a sensed torque between the associated combination vehicle and the associated roadway during a change in speed of the associated combination vehicle relative to the associated roadway.

The logic of the control unit is executed by the processor in step 1208 to determine Axle Load Allocation Factor (ALAF) data in accordance with a predetermined combination of the vehicle trailer axle load data, the vehicle drive axle load data, and the vehicle steering axle load data. The ALAF is determined in accordance with:

$$ALAF = \frac{(DriveAxle_{loading} - TrailerAxle_{loading})}{(SteeringAxle_{loading} + DriveAxle_{loading} + TrailerAxler_{loading})}$$

where:

$DriveAxle_{loading}$ comprises the vehicle drive axle load data;

$TrailerAxle_{loading}$ comprises the vehicle trailer axle load data; and $SteeringAxle_{loading}$ comprises the vehicle steering axle load data.

In step 1210 the determined ALAF is applied as the vehicle operating condition lookup data to the vehicle stopping distance table stored in the non-transient memory device.

In step 1212 the predicted stopping distance is retrieved from the vehicle stopping distance table.

The dynamic braking capability of the associated combination vehicle is determined as the predicted stopping distance in step 1214.

In accordance with example embodiments, the determination of various platooning parameters may be made by the controller disposed in the associated combination vehicle. For example, a determination of a capability of collaborative platooning between the associated combination vehicle and the first associated other combination vehicle may be made by the controller disposed in the associated combination vehicle. Other examples of platooning parameters that may be made by the controller include but are not limited to determining a platoon vehicle ordering or ranking during the collaborative platooning, and of determining inter-vehicle gap distance(s) to be maintained during the collaborative platooning.

In accordance with methods for determining various platooning parameters by the controller disposed in the associated combination vehicle, a wireless receiver device coupled with the control unit disposed in the associated combination vehicle may receive a first dynamic braking capability signal from a first associated other combination vehicle. The associated other combination vehicle may be travelling with the associated combination vehicle on an associated roadway, or the like. The various platooning parameters may be determined by the processor of the control unit disposed in the associated combination vehicle based on the first dynamic braking capability signal received from the first associated other combination vehicle.

In accordance with an example embodiment, the logic is executed by the processor of the control unit of the associated combination vehicle to compare the first dynamic braking capability signal received from the first associated other combination vehicle with the dynamic braking capability of the associated combination vehicle to determine a collaborative platooning capability between the associated combination vehicle and the first associated other combination vehicle based on the comparison. The method includes transmitting, by a wireless transmitter device coupled with the control unit and in operative communication with the first associated other combination vehicle travelling with the associated combination vehicle on the associated roadway, a platooning permit signal to the first associated other combination vehicle for initiating the collaborative platooning between the associated combination vehicle and the first associated other combination vehicle.

In accordance with yet a further example embodiment, the logic is executed by the processor of the control unit of the associated combination vehicle to compare the first dynamic braking capability signal received from the first associated other combination vehicle with the dynamic braking capability of the associated combination vehicle to determine a collaborative platooning vehicle ordering during collaborative platooning between the associated combination vehicle and the first associated other combination vehicle based on the comparison. The method includes transmitting, by a wireless transmitter device coupled with the control unit and in operative communication with the first associated other combination vehicle travelling with the associated combination vehicle on the associated roadway a platooning vehicle ordering signal to the first associated other combination vehicle for establishing the vehicle platoon ordering during the collaborative platooning between the associated combination vehicle and the first associated other combination vehicle.

In accordance with yet a still further example embodiment, the logic is executed by the processor of the control unit of the associated combination vehicle to compare the first dynamic braking capability signal received from the first associated other combination vehicle with the dynamic braking capability of the associated combination vehicle to determine a platooning gap distance to be maintained between the associated combination vehicle and the first associated other combination vehicle during collaborative platooning between the associated combination vehicle and the first associated other combination vehicle based on the comparison. The method includes transmitting, by a wireless transmitter device coupled with the control unit and in operative communication with the first associated other combination vehicle travelling with the associated combination vehicle on the associated roadway a platooning gap distance signal to the first associated other combination vehicle for establishing the platooning gap distance to be maintained between the associated combination vehicle and the first associated other combination vehicle during collaborative platooning between the associated combination vehicle and the first associated other combination vehicle based on the comparison.

In accordance with further example embodiments, the determination of the capability of collaborative platooning between the associated combination vehicle and the first associated other combination vehicle need not be made locally by the processor of the control unit 230 of the associated combination vehicle. In this regard and in accordance still yet a further example embodiment, the wireless transmitter and/or receiver devices or equivalently the transceiver device may for example be in operative wireless communication with one or more remote fleet management facilities, Central Command Centers (CCC), Network Operations Centers (NOC), or the like via a remote wireless communication system 50 and/or a remote satellite system 60 for the determination of various platooning parameters by a remote fleet management system or the like. The remote fleet management system may determine a capability of collaborative platooning between the associated combination vehicle and the first associated other combination vehicle. Other examples of platooning parameters that may be made remotely by a fleet management system, a CCC, a NOC, or the like include but are not limited to determining a platoon vehicle ordering or ranking during the collaborative platooning, and of determining inter-vehicle gap distance(s) to be maintained during the collaborative platooning.

In accordance with methods for determining various platooning parameters by a remote fleet management system, a wireless transmitter device is coupled with the control unit in the associated combination vehicle and is in operative wireless communication with an associated remote fleet management system. The wireless transmitter device transmits the determined dynamic braking capability of the associated combination vehicle to the associated remote fleet management system. In that way, the associated remote fleet management system may process the dynamic braking capability of the associated combination vehicle for determining, at the remote fleet management system, one or more of the various platooning parameters such as, for example, a capability of collaborative platooning between the associated combination vehicle and a first associated other combination vehicle, a platoon vehicle ordering or ranking during the collaborative platooning, inter-vehicle gap distance(s) to be maintained during the collaborative platooning, or the like.

In accordance with a further example embodiment, a wireless receiver device is coupled with the control unit and is in operative wireless communication with the associated remote fleet management system. The wireless receiver receives a platooning permit signal from the associated remote fleet management system for initiating collaborative platooning between the associated combination vehicle and a first associated other combination vehicle travelling with the associated combination vehicle on the associated roadway. In the example embodiment, the platooning permit signal is representative of a capability of the collaborative platooning between the associated combination vehicle and the first associated other combination vehicle as determined by the associated remote fleet management system based on a comparison of a dynamic braking capability of the first associated other combination vehicle with the dynamic braking capability of the associated combination vehicle transmitted to the associated remote fleet management system by the wireless transmitter device of the associated combination vehicle.

In accordance with yet a further example embodiment, a wireless receiver device is coupled with the control unit and is in operative wireless communication with the associated remote fleet management system. The wireless receiver receives a platooning vehicle ordering signal from the associated remote fleet management system for specifying a vehicle ordering during collaborative platooning between the associated combination vehicle and a first associated other combination vehicle travelling with the associated combination vehicle on the associated roadway. In the example embodiment, the platooning vehicle ordering signal being representative of an ordering or platoon ranking to be followed by the associated combination vehicle relative to the first associated other combination vehicle during the collaborative platooning as determined by the associated remote fleet management system based on a comparison of a dynamic braking capability of the first associated other combination vehicle with the dynamic braking capability of the associated combination vehicle transmitted to the associated remote fleet management system by the wireless transmitter device of the associated combination vehicle.

In accordance with yet a still further example embodiment, a wireless receiver device is coupled with the control unit and is in operative wireless communication with the associated remote fleet management system. The wireless receiver receives a platooning gap distance signal from the associated remote fleet management system for setting an inter-vehicle gap distance to be maintained during collaborative platooning between the associated combination vehicle and a first associated other combination vehicle. In the example embodiment, the platooning gap distance signal being representative of a distance to be maintained by the associated combination vehicle relative to the first associated other combination vehicle during the collaborative platooning as determined by the associated remote fleet management system based on a comparison of a dynamic braking capability of the first associated other combination vehicle with the dynamic braking capability of the associated combination vehicle transmitted to the associated remote fleet management system by the wireless transmitter device of the associated combination vehicle.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system for determining a dynamic braking capability for providing dynamic braking control of a brake system in an associated combination vehicle including a tractor and at least one trailer, the tractor having at least one drive axle and a steering axle, and the at least one trailer having at least one trailer axle, the system comprising:
   a control unit configured to be disposed in the associated combination vehicle and in operative communication with the brake system of the associated combination vehicle, the control unit comprising:
   a processor;
   a non-transient memory device operatively coupled with the processor;
   logic stored in the non-transient memory device, the logic being executable by the processor to process one or more signals received from the combination vehicle to determine the dynamic braking capability of the associated combination vehicle; and
   a vehicle stopping distance table stored in the non-transient memory device, the vehicle stopping distance table comprising table data mapping vehicle operating condition lookup data to stopping distance output data, the vehicle operating condition lookup data being representative of a vehicle operating condition of the associated combination vehicle and the stopping distance output data being representative of an estimated stopping distance required to stop the associated combination vehicle travelling having the vehicle operating condition; and
   a vehicle load input operatively coupled with the control unit, the vehicle load input being operable to:
   receive a vehicle load signal representative of a sensed load on one or more of the at least one drive axle of the tractor of the associated combination vehicle, the steering axle of the tractor of the associated combination vehicle, and/or the at least one trailer axle of the at least one trailer of the associated combination vehicle; and
   generate vehicle load data representative of the sensed load based on the received vehicle load signal,
   wherein the logic of the control unit is executable by the processor to:
   determine vehicle operating condition data based on the vehicle load data in accordance with a predetermined combination of the sensed load on the one or more of the at least one drive axle of the tractor of the associated combination vehicle, the steering axle of the tractor of the associated combination vehicle, and/or the at least one trailer axle of the at least one trailer of the associated combination vehicle;
   apply the determined vehicle operating condition data as the vehicle operating condition lookup data to the vehicle stopping distance table stored in the non-transient memory device;
   retrieve predicted stopping distance output data mapped relative to the determined vehicle operating condition data by the vehicle stopping distance table, the retrieved predicted stopping distance output data being representative of a predicted stopping distance of the associated combination vehicle based on the determined vehicle operating condition data applied to the vehicle stopping distance table; and
   determine the dynamic braking capability of the associated combination vehicle as the predicted stopping distance,
   wherein the control unit is operable to communicate the determined dynamic braking capability to the brake system for effecting the dynamic braking control in the associated combination vehicle.

2. The system according to claim 1, further comprising:
   a vehicle speed sensor input operatively coupled with the control unit, the vehicle speed sensor input being operable to:
   receive a vehicle speed signal representative of a sensed speed of the associated combination vehicle traveling on an associated roadway; and
   generate vehicle speed data representative of the sensed speed based on the received vehicle speed signal; and
   a vehicle torque sensor input operatively coupled with the control unit, the vehicle torque sensor input being operable to:
   receive a torque signal representative of a sensed torque between the associated combination vehicle and the associated roadway during a change in speed of the associated combination vehicle relative to the associated roadway; and
   generate torque data representative of the sensed torque based on the received torque signal;
   wherein the logic of the control unit is executable by the processor to generate combination vehicle gross mass data in accordance with a predetermined combination of the torque data with the vehicle speed data, the combination vehicle gross mass data being representative of a gross vehicle weight of the combination vehicle,
   wherein the logic of the control unit is executable by the processor to:
   determine the dynamic braking capability of the associated combination vehicle by applying the combination vehicle gross mass data as the vehicle operating condition data to the vehicle stopping distance table.

3. The system according to claim 2, wherein:
the vehicle load input comprises a drive axle load sensor operatively coupled with the control unit and being configured to be disposed at the at least one drive axle of the associated combination vehicle, the drive axle load sensor operating to:
  receive a vehicle drive axle load signal representative of a sensed load on the at least one drive axle of the tractor of the associated combination vehicle; and
  generate vehicle drive axle load data representative of the sensed load based on the received vehicle drive axle load signal;
the logic of the control unit is executable by the processor to provide vehicle steering axle load data representative of a load on the steering axle of the tractor of the combination vehicle;
the logic of the control unit is executable by the processor to determine vehicle trailer axle load data in accordance with a predetermined combination of the combination vehicle gross mass data, the vehicle drive axle load data, and the vehicle steering axle load data; and
the logic of the control unit is executable by the processor to determine the dynamic braking capability of the associated combination vehicle by applying as the vehicle operating condition data a combination of: the vehicle drive axle load data; the vehicle steering axle load data; and the vehicle trailer axle load data to the vehicle stopping distance table.

4. The system according to claim 2, wherein:
the vehicle load input comprises a drive axle load sensor operatively coupled with the control unit and being configured to be disposed at the at least one drive axle of the associated combination vehicle, the drive axle load sensor operating to:
  receive a vehicle drive axle load signal representative of a sensed load on the at least one drive axle of the tractor of the associated combination vehicle; and
  generate vehicle drive axle load data representative of the sensed load based on the received vehicle drive axle load signal;
the logic of the control unit is executable by the processor to determine vehicle steering axle load data in accordance with a predetermined combination of the combination vehicle gross mass data and the vehicle drive axle load data;
the logic of the control unit is executable by the processor to determine vehicle trailer axle load data in accordance with a predetermined combination of the combination vehicle gross mass data, the vehicle drive axle load data, and the vehicle steering axle load data;
the logic of the control unit is executable by the processor to determine Axle Load Allocation Factor (ALAF) data in accordance with a predetermined combination of the vehicle trailer axle load data, the vehicle drive axle load data, and the vehicle steering axle load data in accordance with:

$$ALAF = \frac{(DriveAxle_{loading} - TrailerAxle_{loading})}{(SteeringAxle_{loading} + DriveAxle_{loading} + TrailerAxler_{loading})}$$

where:
$DriveAxle_{loading}$ comprises the vehicle drive axle load data;
$TrailerAxle_{loading}$ comprises the vehicle trailer axle load data; and
$SteeringAxle_{loading}$ comprises the vehicle steering axle load data;

and
the logic of the control unit is executable by the processor to determine the dynamic braking capability of the associated combination vehicle by applying the determined ALAF data as the vehicle operating condition data to the vehicle stopping distance table.

5. The system according to claim 2, wherein:
the vehicle speed sensor input comprises a vehicle speed signal input connection of the control unit in operative communication with a vehicle speed signal output connection of an associated electronic command module (ECM) of the tractor of the associated combination vehicle, wherein the vehicle speed signal input connection of the control unit receives the vehicle speed signal from the vehicle speed signal output connection of the associated ECM of the tractor of the associated combination vehicle;
the vehicle load input comprises a load signal input connection of the control unit in operative communication with a vehicle load output connection of the associated ECM of the tractor of the associated combination vehicle, wherein the load signal input connection of the control unit receives the vehicle load signal from the vehicle load output connection of the associated ECM of the tractor of the associated combination vehicle; and
the vehicle torque sensor input comprises a torque signal input connection of the control unit in operative communication with a vehicle torque output connection of the associated ECM of the tractor of the associated combination vehicle, wherein the torque signal input connection of the control unit receives the torque signal from the vehicle torque output connection of the associated ECM of the tractor of the associated combination vehicle.

6. The system according to claim 2, further comprising:
a speed sensor device operatively coupled with the vehicle speed sensor input, the speed sensor device sensing the speed of the associated combination vehicle traveling on the associated roadway and generating the vehicle speed signal representative of a sensed speed of the associated combination vehicle; and
a pressure sensor device operatively coupled with the vehicle load input, the pressure sensor device sensing a pressure in a suspension air bag of the tractor of the associated combination vehicle and generating the vehicle load signal representative of the sensed pressure as a load on the at least one drive axle of the tractor of the associated combination vehicle,
wherein the vehicle torque sensor input comprises a torque signal input connection of the control unit in operative communication with a vehicle torque signal output connection of an associated electronic command module (ECM) of the tractor of the associated combination vehicle,
wherein the torque signal input connection of the control unit receives the torque signal from the vehicle torque signal output connection of the associated ECM of the tractor of the associated combination vehicle.

7. The system according to claim 1, further comprising:
a plurality of vehicle stopping distance tables stored in the non-transient memory device, wherein each of the plurality of vehicle stopping distance tables comprises particular vehicle table data mapping particular vehicle operating condition lookup data of a particular vehicle combination vehicle configuration to a corresponding particular stopping distance output data of the particular vehicle combination vehicle configuration,
wherein the logic of the control unit is executable by the processor to:
 determine a configuration of the associated combination vehicle;
 select a vehicle stopping distance table from among the plurality of vehicle stopping distance tables in accordance with the determined configuration of the associated combination vehicle;
 determine the vehicle operating condition data in accordance with the vehicle load data;
 apply the determined vehicle operating condition data as the vehicle operating condition lookup data to the selected vehicle stopping distance table;
 retrieve the predicted stopping distance data mapped relative to the determined vehicle operating condition data by the selected vehicle stopping distance table; and
 determine the dynamic braking capability of the associated combination vehicle as the predicted stopping distance retrieved from the selected vehicle stopping distance table.

8. The system according to claim 1, wherein:
the vehicle load input comprises:
 a drive axle load sensor device operatively coupled with the control unit, the drive axle load sensor device being configured to be disposed at the at least one drive axle of the associated combination vehicle, the drive axle load sensor device being operable to:
  receive a vehicle drive axle load signal representative of a sensed load on the at least one drive axle of the tractor of the associated combination vehicle;
  generate vehicle drive axle load data representative of the received vehicle drive axle load signal; and
  transmit the vehicle drive axle load data to the control unit;
 a steering axle load sensor device operatively coupled with the control unit, the steering drive axle load sensor device being configured to be disposed at the steering axle of the associated combination vehicle, the steering axle load sensor device being operable to:
  receive a vehicle steering axle load signal representative of a sensed load on the steering axle of the tractor of the associated combination vehicle;
  generate vehicle steering axle load data representative of the received vehicle steering axle load signal; and
  transmit the vehicle steering axle load data to the control unit;
 a trailer axle load sensor device operatively coupled with the control unit, the trailer axle load sensor device being configured to be disposed at the at least one trailer axle of the associated combination vehicle, the trailer axle load sensor device being operable to:
  receive a trailer axle load signal representative of a sensed load on the at least one trailer axle of the at least one trailer of the associated combination vehicle;
  generate trailer axle load data representative of the received trailer axle load signal, and
  transmit the trailer axle load data to the control unit;
the logic of the control unit is executable by the processor to:
 determine the vehicle operating condition data in accordance with the vehicle drive axle load data, the vehicle steering axle load data, and trailer axle load data, and determine the dynamic braking capability of the associated combination vehicle by applying the determined vehicle operating condition data as the vehicle operating condition lookup data to the vehicle stopping distance table stored in the non-transient memory device.

9. The system according to claim 8, wherein one or more of the drive axle load sensor device, the steering axle load sensor device, and/or the trailer axle load sensor device comprise a wireless transmitter device configured to wirelessly transmit the vehicle drive axle load data, the vehicle steering axle load data, and/or the trailer axle load data to the control unit, respectively.

10. The system according to claim 1, wherein
the vehicle load input comprises a wireless receiver device operatively coupled with the control unit and being configured to be disposed in the associated combination vehicle, the wireless receiver device being in selective operative communication with an associated weigh station transmitter of an associated vehicle weigh station system, the wireless receiver device being operable to:
 receive from the weigh station transmitter of the associated vehicle weigh station system the vehicle load signal representative of the sensed load distribution on the one or more of the at least one drive axle of the tractor of the associated combination vehicle, the steering axle of the tractor of the associated combination vehicle, and/or the at least one trailer axle of the at least one trailer of the associated combination vehicle;
 generate the vehicle load data representative of the received vehicle load signal; and
 deliver the generated vehicle load data to the control unit.

11. The system according to claim 1, further comprising:
a wireless receiver device coupled with the control unit, the wireless receiver device being in operative communication with a first associated other combination vehicle travelling with the associated combination vehicle on the associated roadway, the wireless receiver device receiving a first dynamic braking capability signal from the first associated other combination vehicle; and
a wireless transmitter device coupled with the control unit, the wireless transmitter device being in operative communication with the first associated other combination vehicle travelling with the associated combination vehicle on the associated roadway,
wherein the logic is executable by the processor of the control unit of the associated combination vehicle to compare the first dynamic braking capability signal received from the first associated other combination vehicle with the dynamic braking capability of the associated combination vehicle to determine a capability of collaborative platooning between the associated combination vehicle and the first associated other combination vehicle based on the comparison, wherein the wireless transmitter device is operable to transmit a platooning permit signal to the first associated other combination vehicle for initiating the collaborative platooning between the associated combination vehicle and the first associated other combination vehicle.

12. The system according to claim 1, further comprising:
a wireless receiver device coupled with the control unit, the wireless receiver device being in operative communication with a first associated other combination vehicle travelling with the associated combination vehicle on the associated roadway, the wireless receiver device receiving a first dynamic braking capability signal from the first associated other combination vehicle; and
a wireless transmitter device coupled with the control unit, the wireless transmitter device being in operative communication with the first associated other combination vehicle travelling with the associated combination vehicle on the associated roadway,
wherein the logic is executable by the processor of the control unit of the associated combination vehicle to compare the first dynamic braking capability signal received from the first associated other combination vehicle with the dynamic braking capability of the associated combination vehicle to determine a collaborative platooning vehicle ordering during collaborative platooning between the associated combination vehicle and the first associated other combination vehicle based on the comparison,
wherein the wireless transmitter device is operable to transmit a platooning vehicle ordering signal to the first associated other combination vehicle for establishing the vehicle platoon ordering during the collaborative platooning between the associated combination vehicle and the first associated other combination vehicle.

13. The system according to claim 1, further comprising:
a wireless receiver device coupled with the control unit, the wireless receiver device being in operative communication with a first associated other combination vehicle travelling with the associated combination vehicle on the associated roadway, the wireless receiver device receiving a first dynamic braking capability signal from the first associated other combination vehicle; and
a wireless transmitter device coupled with the control unit, the wireless transmitter device being in operative communication with the first associated other combination vehicle travelling with the associated combination vehicle on the associated roadway,
wherein the logic is executable by the processor of the control unit of the associated combination vehicle to compare the first dynamic braking capability signal received from the first associated other combination vehicle with the dynamic braking capability of the associated combination vehicle to determine a platooning gap distance to be maintained between the associated combination vehicle and the first associated other combination vehicle during collaborative platooning between the associated combination vehicle and the first associated other combination vehicle based on the comparison,
wherein the wireless transmitter device is operable to transmit a platooning gap distance signal to the first associated other combination vehicle for establishing the platooning gap distance to be maintained between the associated combination vehicle and the first associated other combination vehicle during collaborative platooning between the associated combination vehicle and the first associated other combination vehicle based on the comparison.

14. The system according to claim 1, further comprising:
a wireless transmitter device coupled with the control unit, the wireless transmitter device being in operative wireless communication with one or more of an associated remote fleet management system and/or a first associated other combination vehicle travelling with the associated combination vehicle on the associated roadway, the wireless transmitter device being controlled by the processor of the control unit executing the logic stored in the memory device to transmit the determined dynamic braking capability of the associated combination vehicle to the one or more of the associated remote fleet management system and/or the first associated other combination vehicle; and
a wireless receiver device coupled with the control unit, the wireless receiver device being in operative wireless communication with the one or more of:
the associated remote fleet management system; and/or
the first associated other combination vehicle,
the wireless receiver device being operated by the processor of the control unit executing the logic stored in the memory device to receive a platooning permit signal from the one or more of the associated remote fleet management system and/or the first associated other combination vehicle for initiating collaborative platooning between the associated combination vehicle and the first associated other combination vehicle, the platooning permit signal being representative of a capability of the collaborative platooning between the associated combination vehicle and the first associated other combination vehicle as determined by the one or more of the associated remote fleet management system and/or the first associated other combination vehicle based on a comparison of a dynamic braking capability of the first associated other combination vehicle with the dynamic braking capability of the associated combination vehicle transmitted to the one or more of the associated remote fleet management system and/or the first associated other combination vehicle by the wireless transmitter device of the associated combination vehicle.

15. The system according to claim 1, further comprising:
a wireless transmitter device coupled with the control unit, the wireless transmitter device being in operative wireless communication with one or more of an associated remote fleet management system and/or a first associated other combination vehicle travelling with the associated combination vehicle on the associated roadway, the wireless transmitter device being controlled by the processor of the control unit executing the logic stored in the memory device to transmit the determined dynamic braking capability of the associated combination vehicle to the one or more of the associated remote fleet management system and/or the first associated other combination vehicle; and
a wireless receiver device coupled with the control unit, the wireless receiver device being in operative wireless communication with one or more of:
the associated remote fleet management system; and/or
the first associated other combination vehicle, the wireless receiver device being operated by the processor of the control unit executing the logic stored in the memory device to receive a platooning vehicle ordering signal from the one or more of the associated remote fleet management system and/or the first associated other combination vehicle for specifying a vehicle ordering during collaborative platooning between the associated combination vehicle and the first associated other combination vehicle, the platooning vehicle ordering signal being representative of an ordering or platoon ranking to be followed by the associated combination vehicle relative to the first associated other combination vehicle during the collaborative platooning as determined by the one or more of the associated remote fleet management system and/or the first associated other combination vehicle based on a comparison of a dynamic braking capability of the first associated other combination vehicle with the dynamic braking capability of the associated combination vehicle transmitted to the one or more of the associated remote fleet management system and/or the first associated other combination vehicle by the wireless transmitter device of the associated combination vehicle.

16. The system according to claim 1, further comprising:
a wireless transmitter device coupled with the control unit, the wireless transmitter device being in operative wireless communication with one or more of an associated remote fleet management system and/or a first associated other combination vehicle travelling with the associated combination vehicle on the associated roadway, the wireless transmitter device being controlled by the processor of the control unit executing the logic stored in the memory device to transmit the determined dynamic braking capability of the associated combination vehicle to the one or more of the associated remote fleet management system and/or the first associated other combination vehicle; and
a wireless receiver device coupled with the control unit, the wireless receiver device being in operative wireless communication with the one or more of:
the associated remote fleet management system; and/or
the first associated other combination vehicle,
the wireless receiver device being operated by the processor of the control unit executing the logic stored in the memory device to receive a platooning gap distance signal from the one or more of the associated remote fleet management system and/or the first associated other combination vehicle for setting an inter-vehicle gap distance to be maintained during collaborative platooning between the associated combination vehicle and the first associated other combination vehicle, the platooning gap distance signal being representative of a distance to be maintained by the associated combination vehicle relative to the first associated other combination vehicle during the collaborative platooning as determined by the one or more of the associated remote fleet management system and/or the first associated other combination vehicle based on a comparison of a dynamic braking capability of the first associated other combination vehicle with the dynamic braking capability of the associated combination vehicle transmitted to the one or more of the associated remote fleet management system and/or the first associated other combination vehicle by the wireless transmitter device of the associated combination vehicle.

17. A method for determining a dynamic braking capability for providing dynamic braking control of a brake system in an associated combination vehicle including a tractor having at least one drive axle and a steering axle, and at least one trailer having at least one trailer axle, the method comprising:
providing a control unit in the associated combination vehicle, the control unit being in operative communication with the brake system of the associated combination vehicle and comprising a processor, a non-transient memory device operatively coupled with the processor, and logic stored in the non-transient memory device and being executable by the processor to determine the dynamic braking capability of the associated combination vehicle;
storing a vehicle stopping distance table in the non-transient memory device, the vehicle stopping distance table comprising table data mapping vehicle operating condition lookup data to stopping distance output data, the vehicle operating condition lookup data being representative of a vehicle operating condition of the associated combination vehicle and the stopping distance output data being representative of an estimated stopping distance required to stop the associated combination vehicle travelling having the vehicle operating condition;
receiving, by a vehicle load input operatively coupled with the control unit, a vehicle load signal representative of a sensed load on one or more of the at least one drive axle of the tractor of the associated combination vehicle, the steering axle of the tractor of the associated combination vehicle, and/or the at least one trailer axle of the at least one trailer of the associated combination vehicle;
generating, by the vehicle load input, vehicle load data representative of the sensed load based on the received vehicle load signal; and
executing the logic by the processor of the control unit to:
determine vehicle operating condition data based on the vehicle load data in accordance with a predetermined combination of the sensed load on the one or more of the at least one drive axle of the tractor of the associated combination vehicle, the steering axle of the tractor of the associated combination vehicle, and/or the at least one trailer axle of the at least one trailer of the associated combination vehicle;
apply the determined vehicle operating condition data as the vehicle operating condition lookup data to the vehicle stopping distance table stored in the non-transient memory device;
retrieve predicted stopping distance output data mapped relative to the determined vehicle operating condition data by the vehicle stopping distance table, the retrieved predicted stopping distance output data being representative of a predicted stopping distance of the associated combination vehicle based on the determined vehicle operating condition data applied to the vehicle stopping distance table; and
determine the dynamic braking capability of the associated combination vehicle as the predicted stopping distance,
wherein the control unit is operable to communicate the determined dynamic braking capability to the brake system for effecting the dynamic braking control in the associated combination vehicle.

18. The method according to claim 17, further comprising:
  receiving, by a vehicle speed sensor input operatively coupled with the control unit, a vehicle speed signal representative of a sensed speed of the associated combination vehicle traveling on an associated roadway;
  generating, by the vehicle speed sensor input, vehicle speed data representative of the sensed speed based on the received vehicle speed signal;
  receiving, by a vehicle torque sensor input operatively coupled with the control unit, a torque signal representative of a sensed torque between the associated combination vehicle and the associated roadway during a change in speed of the associated combination vehicle relative to the associated roadway;
  generating, by the vehicle torque sensor, torque data representative of the sensed torque based on the received torque signal;
  executing the logic of the control unit by the processor to generate combination vehicle gross mass data in accordance with a predetermined combination of the torque data with the vehicle speed data, the combination vehicle gross mass data being representative of a gross vehicle weight of the combination vehicle; and
  executing the logic of the control unit by the processor to determine the dynamic braking capability of the associated combination vehicle by applying the combination vehicle gross mass data as the vehicle operating condition data to the vehicle stopping distance table.

19. The method according to claim 18, wherein:
  the receiving, by the vehicle load input, comprises receiving the vehicle load signal from a drive axle load sensor operatively coupled with the control unit and disposed at the at least one drive axle of the associated combination vehicle, the drive axle load sensor input operating to:
    receive a vehicle drive axle load signal representative of a sensed load on the at least one drive axle of the tractor of the associated combination vehicle; and
    generate vehicle drive axle load data representative of the sensed load based on the received vehicle drive axle load signal;
  the executing the logic of the control unit by the processor comprises executing the logic to provide vehicle steering axle load data representative of a load on the steering axle of the tractor of the combination vehicle;
  the executing the logic of the control unit by the processor comprises executing the logic to determine vehicle trailer axle load data in accordance with a predetermined combination of the combination vehicle gross mass data, the vehicle drive axle load data, and the vehicle steering axle load data; and
  the executing the logic of the control unit by the processor comprises executing the logic to determine the dynamic braking capability of the associated combination vehicle by applying as the vehicle operating condition data a combination of: the vehicle drive axle load data; the vehicle steering axle load data; and the vehicle trailer axle load data to the vehicle stopping distance table.

20. The method according to claim 18, wherein:
  the receiving, by the vehicle load input, comprises receiving the vehicle load signal from a drive axle load sensor input operatively coupled with the control unit and being configured to be disposed at the at least one drive axle of the associated combination vehicle, the drive axle load sensor input operating to:
    receive a vehicle drive axle load signal representative of a sensed load on the at least one drive axle of the tractor of the associated combination vehicle; and
    generate vehicle drive axle load data representative of the sensed load based on the received vehicle drive axle load signal;
  the executing the logic of the control unit by the processor comprises executing the logic to determine vehicle steering axle load data in accordance with a predetermined combination of the combination vehicle gross mass data and the vehicle drive axle load data;
  the executing the logic of the control unit by the processor comprises executing the logic to determine vehicle trailer axle load data in accordance with a predetermined combination of the combination vehicle gross mass data, the vehicle drive axle load data, and the vehicle steering axle load data;
  the executing the logic of the control unit by the processor comprises executing the logic to determine Axle Load Allocation Factor (ALAF) data in accordance with a predetermined combination of the vehicle trailer axle load data, the vehicle drive axle load data, and the vehicle steering axle load data in accordance with:

$$ALAF = \frac{(DriveAxle_{loading} - TrailerAxle_{loading})}{(SteeringAxle_{loading} + DriveAxle_{loading} + TrailerAxler_{loading})}$$

where:
    $DriveAxle_{loading}$ comprises the vehicle drive axle load data;
    $TrailerAxle_{loading}$ comprises the vehicle trailer axle load data; and
    $SteeringAxle_{loading}$ comprises the vehicle steering axle load data;

and
  the executing the logic of the control unit by the processor comprises executing the logic to determine the dynamic braking capability of the associated combination vehicle by applying the determined ALAF data as the vehicle operating condition data to the vehicle stopping distance table.

21. The method according to claim 18, wherein:
  the receiving the vehicle speed signal comprises receiving the vehicle speed signal from a vehicle speed signal input connection of the control unit in operative communication with a vehicle speed signal output connection of an associated electronic command module (ECM) of the tractor of the associated combination vehicle, wherein the vehicle speed signal input connection of the control unit receives the vehicle speed signal from the vehicle speed signal output connection of the associated ECM of the tractor of the associated combination vehicle;
  the receiving the vehicle load input comprises receiving the vehicle load input from a load signal input connection of the control unit in operative communication with a vehicle load output connection of the associated ECM of the tractor of the associated combination vehicle, wherein the load signal input connection of the control unit receives the vehicle load signal from the vehicle load output connection of the associated ECM of the tractor of the associated combination vehicle; and the receiving the vehicle torque sensor input comprises receiving the vehicle torque sensor input from a torque signal input connection of the control unit in operative communication with a vehicle torque output connection of the associated ECM of the tractor of the associated combination vehicle, wherein the torque signal input connection of the control unit receives the torque signal from the vehicle torque output connection of the associated ECM of the tractor of the associated combination vehicle.

22. The method according to claim 18, further comprising:
receiving the vehicle speed signal from a speed sensor device operatively coupled with the vehicle speed sensor input, the speed sensor device sensing the speed of the associated combination vehicle traveling on the associated roadway and generating the vehicle speed signal representative of a sensed speed of the associated combination vehicle;
receiving the vehicle load signal from a pressure sensor device operatively coupled with the vehicle load input, the pressure sensor device sensing a pressure in a suspension air bag of the tractor of the associated combination vehicle and generating the vehicle load signal representative of the sensed pressure as a load on the at least one drive axle of the tractor of the associated combination vehicle,
receiving the vehicle torque sensor input from a torque signal input connection of the control unit in operative communication with a vehicle torque signal output connection of an associated electronic command module (ECM) of the tractor of the associated combination vehicle; and
receiving the torque signal input from the vehicle torque signal output connection of the associated ECM of the tractor of the associated combination vehicle.

23. The method according to claim 17, further comprising:
storing a plurality of vehicle stopping distance tables in the non-transient memory device, wherein each of the plurality of vehicle stopping distance tables comprises particular vehicle table data mapping particular vehicle operating condition lookup data of a particular vehicle combination vehicle configuration to a corresponding particular stopping distance output data of the particular vehicle combination vehicle configuration; and
executing the logic of the control unit by the processor to:
determine a configuration of the associated combination vehicle;
select a vehicle stopping distance table from among the plurality of vehicle stopping distance tables in accordance with the determined configuration of the associated combination vehicle;
determine the vehicle operating condition data in accordance with the vehicle load data;
apply the determined vehicle operating condition data as the vehicle operating condition lookup data to the selected vehicle stopping distance table;
retrieve the predicted stopping distance data mapped relative to the determined vehicle operating condition data by the selected vehicle stopping distance table; and
determine the dynamic braking capability of the associated combination vehicle as the predicted stopping distance retrieved from the selected vehicle stopping distance table.

24. The method according to claim 17, wherein:
the receiving the vehicle load signal by the vehicle load input comprises receiving the vehicle load signal from one or more of:
a drive axle load sensor device operatively coupled with the control unit, the drive axle load sensor device being configured to be disposed at the at least one drive axle of the associated combination vehicle, the drive axle load sensor device being operable to:
receive a vehicle drive axle load signal representative of a sensed load on the at least one drive axle of the tractor of the associated combination vehicle;
generate vehicle drive axle load data representative of the received vehicle drive axle load signal; and
transmit the vehicle drive axle load data to the control unit;
a steering axle load sensor device operatively coupled with the control unit, the steering drive axle load sensor device being configured to be disposed at the steering axle of the associated combination vehicle, the steering axle load sensor device being operable to:
receive a vehicle steering axle load signal representative of a sensed load on the steering axle of the tractor of the associated combination vehicle;
generate vehicle steering axle load data representative of the received vehicle steering axle load signal; and
transmit the vehicle steering axle load data to the control unit; and/or
a trailer axle load sensor device operatively coupled with the control unit, the trailer axle load sensor device being configured to be disposed at the at least one trailer axle of the associated combination vehicle, the trailer axle load sensor device being operable to:
receive a trailer axle load signal representative of a sensed load on the at least one trailer axle of the at least one trailer of the associated combination vehicle;
generate trailer axle load data representative of the received trailer axle load signal, and
transmit the trailer axle load data to the control unit; and
the executing the logic of the control unit comprising executing the logic to:
determine the vehicle operating condition data in accordance with the vehicle drive axle load data, the vehicle steering axle load data, and trailer axle load data, and determine the dynamic braking capability of the associated combination vehicle by applying the determined vehicle operating condition data as the vehicle operating condition lookup data to the vehicle stopping distance table stored in the non-transient memory device.

25. The method according to claim 24, further comprising receiving, by a wireless receiver, one or more of:
the vehicle drive axle load data from a wireless drive axle load sensor device;
the vehicle steering axle load data from a wireless steering axle load sensor device; and/or
the trailer axle load data from a wireless trailer axle load sensor device.

26. The method according to claim 17, wherein
the receiving the vehicle load signal comprises receiving the vehicle load signal by a wireless receiver device operatively coupled with the control unit and being configured to be disposed in the associated combination vehicle, the wireless receiver device being in selective operative communication with an associated weigh station transmitter device of an associated vehicle weigh station system, the wireless receiver device operating to:
  receive from the weigh station transmitter device of the associated vehicle weigh station system the vehicle load signal representative of the sensed load distribution on the one or more of the at least one drive axle of the tractor of the associated combination vehicle, the steering axle of the tractor of the associated combination vehicle, and/or the at least one trailer axle of the at least one trailer of the associated combination vehicle;
  generate the vehicle load data representative of the received vehicle load signal; and
  deliver the generated vehicle load data to the control unit.

27. The method according to claim 17, further comprising:
  receiving, by a wireless receiver device coupled with the control unit and in operative communication with a first associated other combination vehicle travelling with the associated combination vehicle on the associated roadway, a first dynamic braking capability signal from the first associated other combination vehicle;
  executing the logic by the processor of the control unit of the associated combination vehicle to compare the first dynamic braking capability signal received from the first associated other combination vehicle with the dynamic braking capability of the associated combination vehicle to determine a collaborative platooning capability between the associated combination vehicle and the first associated other combination vehicle based on the comparison; and
  transmitting, by a wireless transmitter device coupled with the control unit and in operative communication with the first associated other combination vehicle travelling with the associated combination vehicle on the associated roadway, a platooning permit signal to the first associated other combination vehicle for initiating the collaborative platooning between the associated combination vehicle and the first associated other combination vehicle.

28. The method according to claim 17, further comprising:
  receiving, by a wireless receiver device coupled with the control unit and in operative communication with a first associated other combination vehicle travelling with the associated combination vehicle on the associated roadway, a first dynamic braking capability signal from the first associated other combination vehicle;
  executing the logic by the processor of the control unit of the associated combination vehicle to compare the first dynamic braking capability signal received from the first associated other combination vehicle with the dynamic braking capability of the associated combination vehicle to determine a collaborative platooning vehicle ordering during collaborative platooning between the associated combination vehicle and the first associated other combination vehicle based on the comparison; and
  operating the wireless transmitter device to transmit a platooning vehicle ordering signal to the first associated other combination vehicle for establishing the vehicle platoon ordering during the collaborative platooning between the associated combination vehicle and the first associated other combination vehicle.

29. The method according to claim 17, further comprising:
  receiving, by a wireless receiver device coupled with the control unit and in operative communication with a first associated other combination vehicle travelling with the associated combination vehicle on the associated roadway, a first dynamic braking capability signal from the first associated other combination vehicle;
  executing the logic by the processor of the control unit of the associated combination vehicle to compare the first dynamic braking capability signal received from the first associated other combination vehicle with the dynamic braking capability of the associated combination vehicle to determine a platooning gap distance to be maintained between the associated combination vehicle and the first associated other combination vehicle during collaborative platooning between the associated combination vehicle and the first associated other combination vehicle based on the comparison; and
  operating the wireless transmitter device to transmit a platooning gap distance signal to the first associated other combination vehicle for establishing the platooning gap distance to be maintained between the associated combination vehicle and the first associated other combination vehicle during collaborative platooning between the associated combination vehicle and the first associated other combination vehicle based on the comparison.

30. The method according to claim 17, further comprising:
  transmitting, by a wireless transmitter device coupled with the control unit and in operative wireless communication with one or more of an associated remote fleet management system and/or a first associated other combination vehicle travelling with the associated combination vehicle on the associated roadway, the determined dynamic braking capability of the associated combination vehicle to the associated remote fleet management system; and
  receiving, by a wireless receiver device coupled with the control unit, a platooning permit signal from the one or more of the associated remote fleet management system and/or the first associated other combination vehicle for initiating collaborative platooning between the associated combination vehicle and the first associated other combination vehicle, the platooning permit signal being representative of a capability of the collaborative platooning between the associated combination vehicle and the first associated other combination vehicle as determined by the one or more of the associated remote fleet management system and/or the first associated other combination vehicle based on a comparison of a dynamic braking capability of the first associated other combination vehicle with the dynamic braking capability of the associated combination vehicle transmitted to the one or more of the associated remote fleet management system and/or the first associated other combination vehicle by the wireless transmitter device of the associated combination vehicle.

31. The method according to claim 17, further comprising:
  transmitting, by a wireless transmitter device coupled with the control unit and in operative wireless communication with one or more of an associated remote fleet management system and/or a first associated other combination vehicle travelling with the associated combination vehicle on the associated roadway, the determined dynamic braking capability of the associated combination vehicle to the associated remote fleet management system; and receiving, by a wireless receiver device coupled with the control unit, a platooning vehicle ordering signal from the one or more of the associated remote fleet management system and/or the first associated other combination vehicle for specifying a vehicle ordering during collaborative platooning between the associated combination vehicle and the first associated other combination vehicle, the platooning vehicle ordering signal being representative of an ordering or platoon ranking to be followed by the associated combination vehicle relative to the first associated other combination vehicle during the collaborative platooning as determined by the one or more of the associated remote fleet management system and/or the first associated other combination vehicle based on a comparison of a dynamic braking capability of the first associated other combination vehicle with the dynamic braking capability of the associated combination vehicle transmitted to the one or more of the associated remote fleet management system and/or the first associated other combination vehicle by the wireless transmitter device of the associated combination vehicle.

32. The method according to claim 17, further comprising:

transmitting, by a wireless transmitter device coupled with the control unit and in operative wireless communication with one or more of an associated remote fleet management system and/or a first associated other combination vehicle travelling with the associated combination vehicle on the associated roadway, the determined dynamic braking capability of the associated combination vehicle to the associated remote fleet management system; and receiving, by a wireless receiver device coupled with the control unit, a platooning gap distance signal from the one or more of the associated remote fleet management system and/or the first associated other combination vehicle for setting an inter-vehicle gap distance to be maintained during collaborative platooning between the associated combination vehicle and the first associated other combination vehicle, the platooning gap distance signal being representative of a distance to be maintained by the associated combination vehicle relative to the first associated other combination vehicle during the collaborative platooning as determined by the one or more of the associated remote fleet management system and/or the first associated other combination vehicle based on a comparison of a dynamic braking capability of the first associated other combination vehicle with the dynamic braking capability of the associated combination vehicle transmitted to the one or more of the associated remote fleet management system and/or the first associated other combination vehicle by the wireless transmitter device of the associated combination vehicle.

33. The system according to claim 1, wherein:
the vehicle load input is operable to receive the vehicle load signal representative of the load sensed on:
the at least one drive axle of the tractor of the associated combination vehicle as vehicle drive axle load data;
the steering axle of the tractor of the associated combination vehicle as vehicle steering axle load data; and
the at least one trailer axle of the at least one trailer of the associated combination vehicle as vehicle trailer axle load data;

the logic of the control unit is executable by the processor to determine Axle Load Allocation Factor (ALAF) data in accordance with a predetermined combination of the vehicle trailer axle load data, the vehicle drive axle load data, and the vehicle steering axle load data in accordance with:

$$ALAF = \frac{(DriveAxle_{loading} - TrailerAxle_{loading})}{(SteeringAxle_{loading} + DriveAxle_{loading} + TrailerAxler_{loading})}$$

where:

$DriveAxle_{loading}$ comprises the vehicle drive axle load data;

$TrailerAxle_{loading}$ comprises the vehicle trailer axle load data; and $SteeringAxle_{loading}$ comprises the vehicle steering axle load data;

and
the logic of the control unit is executable by the processor to determine the dynamic braking capability of the associated combination vehicle by applying the determined ALAF data as the vehicle operating condition data to the vehicle stopping distance table.

34. The method according to claim 17, wherein:
the receiving the vehicle load signal comprises receiving the vehicle load signal representative of the load sensed on:
the at least one drive axle of the tractor of the associated combination vehicle as vehicle drive axle load data;
the steering axle of the tractor of the associated combination vehicle as vehicle steering axle load data; and
the at least one trailer axle of the at least one trailer of the associated combination vehicle as vehicle trailer axle load data;

the executing the logic of the control unit by the processor comprises executing the logic to determine Axle Load Allocation Factor (ALAF) data in accordance with a predetermined combination of the vehicle trailer axle load data, the vehicle drive axle load data, and the vehicle steering axle load data in accordance with:

$$ALAF = \frac{(DriveAxle_{loading} - TrailerAxle_{loading})}{(SteeringAxle_{loading} + DriveAxle_{loading} + TrailerAxler_{loading})}$$

where:

$DriveAxle_{loading}$ comprises the vehicle drive axle load data;

$TrailerAxle_{loading}$ comprises the vehicle trailer axle load data; and $SteeringAxle_{loading}$ comprises the vehicle steering axle load data;

and
the executing the logic of the control unit by the processor comprises executing the logic to determine the dynamic braking capability of the associated combination vehicle by applying the determined ALAF data as the vehicle operating condition data to the vehicle stopping distance table.

* * * * *